United States Patent
Bai et al.

(10) Patent No.: US 11,770,813 B2
(45) Date of Patent: Sep. 26, 2023

(54) TECHNIQUES FOR MANAGING A TRANSMISSION CONFIGURATION INDICATOR STATE

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/316,578

(22) Filed: May 10, 2021

(65) Prior Publication Data

US 2022/0361160 A1    Nov. 10, 2022

(51) Int. Cl.
*H04W 72/04*     (2023.01)
*H04W 72/10*     (2009.01)
*H04W 72/044*    (2023.01)
*H04W 72/23*     (2023.01)

(52) U.S. Cl.
CPC ......... *H04W 72/046* (2013.01); *H04W 72/23* (2023.01)

(58) Field of Classification Search
CPC ................... H04W 72/046; H04W 72/042
See application file for complete search history.

(56) References Cited

U.S. PATENT DOCUMENTS

| | | | |
|---|---|---|---|
| 2019/0268053 A1* | 8/2019 | Wilson | H04W 72/042 |
| 2020/0374960 A1* | 11/2020 | Deenoo | H04W 72/1284 |
| 2020/0413340 A1* | 12/2020 | Nam | H04W 76/20 |
| 2021/0314931 A1* | 10/2021 | Farag | H04B 7/0695 |
| 2022/0132549 A1* | 4/2022 | Yu | H04L 1/1854 |
| 2022/0149921 A1* | 5/2022 | Nilsson | H04B 7/0452 |

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) may be configured to receive a downlink control information (DCI) message including an indication to update a transmission configuration indicator (TCI) state associated with a communications channel between the UE and a base station. In some examples, the indication may trigger the UE (e.g., implicitly or explicitly) to participate in a beam management procedure involving one or more beams associated with the TCI state. As such, the UE may participate in the beam management procedure with the base station, where the beam management procedure may include the transmission of reference signals (e.g., sounding reference signals (SRSs), the reception of reference signals (e.g., channel state information (CSI) reference signals (RSs)), or a combination thereof.

23 Claims, 16 Drawing Sheets

TECHNIQUES FOR MANAGING A TRANSMISSION CONFIGURATION INDICATOR STATE

FIELD OF TECHNOLOGY

The following relates to wireless communications, including techniques for managing a transmission configuration indicator (TCI) state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate using one or more beams in accordance with a respective transmission configuration indicator (TCI) state. In some cases, the base station may indicate one or more TCI states the UE may use for communicating with the base station. Techniques for configuring TCI states may be improved.

SUMMARY

The described techniques relate to improved methods, systems, devices, and apparatuses that support techniques for managing a transmission configuration indicator (TCI) state. For example, the described techniques provide for managing communication beams (e.g., by managing one or more respective TCI states) between a base station and user equipment (UE). In some cases, a base station may transmit an indication to a UE for the UE to update a TCI state associated with a communications channel between the UE and base station. In some cases, the indication to update the TCI state may (e.g., implicitly, or explicitly) trigger the UE to perform a beam management procedure associated with the TCI state. In some cases, the indication may trigger the UE to perform one or more measurements associated with the TCI state. That is, the base station may transmit one or more reference signals (e.g., channel state information reference signals (CSI-RSs)) to the UE, and the UE may be configured to monitor for the one or more CSI-RSs. The UE may receive one or more CSI-RSs via one or more beams associated with the TCI state and may perform measurements based on the one or more received CSI-RSs. In some cases, the UE may transmit a beam measurement report to the base station including an indication of the measurements. In some cases, the UE may perform a beam refinement procedure based on the measurements. In some cases, the indication to update the TCI state may trigger the UE to transmit one or more reference signals (e.g., sounding reference signals (SRSs)) to the base station via one or more beams associated with the TCI state. The base station may receive the one or more reference signals and may determine whether to update the TCI state.

A method for wireless communications at UE is described. The method may include receiving, in a downlink control information message, an indication to update a TCI state associated with a communications channel between the UE and a base station, determining, based on receiving the indication to update the TCI state, that the UE is to participate in a beam management procedure involving one or more beams associated with the TCI state, and participating in the beam management procedure through communication, with the base station, of one or more reference signals on the one or more beams associated with the TCI state.

An apparatus for wireless communications at UE is described. The apparatus may include a processor, memory coupled with the processor, and instructions stored in the memory. The instructions may be executable by the processor to cause the apparatus to receive, in a downlink control information message, an indication to update a TCI state associated with a communications channel between the UE and a base station, determine, based on receiving the indication to update the TCI state, that the UE is to participate in a beam management procedure involving one or more beams associated with the TCI state, and participate in the beam management procedure through communication, with the base station, of one or more reference signals on the one or more beams associated with the TCI state.

Another apparatus for wireless communications at UE is described. The apparatus may include means for receiving, in a downlink control information message, an indication to update a TCI state associated with a communications channel between the UE and a base station, means for determining, based on receiving the indication to update the TCI state, that the UE is to participate in a beam management procedure involving one or more beams associated with the TCI state, and means for participating in the beam management procedure through communication, with the base station, of one or more reference signals on the one or more beams associated with the TCI state.

A non-transitory computer-readable medium storing code for wireless communications at UE is described. The code may include instructions executable by a processor to receive, in a downlink control information message, an indication to update a TCI state associated with a communications channel between the UE and a base station, determine, based on receiving the indication to update the TCI state, that the UE is to participate in a beam management procedure involving one or more beams associated with the TCI state, and participate in the beam management procedure through communication, with the base station, of one or more reference signals on the one or more beams associated with the TCI state.

In some examples of the method, apparatuses, and non-transitory computer-readable medium described herein, participating in the beam management procedure may include operations, features, means, or instructions for receiving the one or more reference signals associated with the TCI state, the one or more reference signals being CSI-RSs and performing one or more measurements based on the one or more reference signals.

In some examples of the method, apparatuses, and non-transitory computer-readable medium described herein, receiving the one or more reference signals may include operations, features, means, or instructions for receiving the one or more reference signals via a beam of the one or more beams associated with the TCI state.

In some examples of the method, apparatuses, and non-transitory computer-readable medium described herein, receiving the one or more reference signals may include operations, features, means, or instructions for receiving the one or more reference signals via a set of multiple narrow beams that may be each narrower than and spatially overlapping with, at least in part, a beam of the one or more beams associated with the TCI state.

In some examples of the method, apparatuses, and non-transitory computer-readable medium described herein, receiving the one or more reference signals may include operations, features, means, or instructions for receiving the one or more reference signals via a set of multiple beams, the set of multiple beams including a beam of the one or more beams associated with the TCI state and one or more beams neighboring the beam.

Some examples of the method, apparatuses, and non-transitory computer-readable medium described herein may further include operations, features, means, or instructions for receiving a message indicating a beam configuration for receiving the one or more reference signals, the message received via radio resource control signaling, downlink control information signaling, or medium access control element signaling.

In some examples of the method, apparatuses, and non-transitory computer-readable medium described herein, the beam configuration includes a mapping of the TCI state to one of a CSI report configuration or a CSI trigger state and the method, apparatuses, and non-transitory computer-readable medium may include further operations, features, means, or instructions for determining a set of resources for receiving the one or more reference signals based on the mapping.

Some examples of the method, apparatuses, and non-transitory computer-readable medium described herein may further include operations, features, means, or instructions for transmitting a CSI report on a set of resources based on performing the one or more measurements, where the set of resources may be preconfigured or the UE receives a message indicating the set of resources for transmitting the CSI report.

In some examples of the method, apparatuses, and non-transitory computer-readable medium described herein, participating in the beam management procedure may include operations, features, means, or instructions for performing a beam refinement procedure to update the TCI state based on the one or more measurements.

In some examples of the method, apparatuses, and non-transitory computer-readable medium described herein, performing the one or more measurements may include operations, features, means, or instructions for determining a reference signal received power, signal-to-noise-plus-interference ratio, or a combination thereof based on the one or more reference signals.

In some examples of the method, apparatuses, and non-transitory computer-readable medium described herein, participating in the beam management procedure may include operations, features, means, or instructions for transmitting the one or more reference signals associated with the TCI state, the one or more reference signals being SRSs.

In some examples of the method, apparatuses, and non-transitory computer-readable medium described herein, transmitting the one or more reference signals may include operations, features, means, or instructions for transmitting the one or more reference signals via a resource associated with a beam of the one or more beams associated with the TCI state.

Some examples of the method, apparatuses, and non-transitory computer-readable medium described herein may further include operations, features, means, or instructions for determining the resource based on a predefined rule associated with the TCI state or based on a message received by the UE, the message including a SRS resource indicator associated with the TCI state.

In some examples of the method, apparatuses, and non-transitory computer-readable medium described herein, transmitting the one or more reference signals may include operations, features, means, or instructions for transmitting the one or more reference signals via a set of resources, the set of resources associated with a set of multiple narrow beams that may be each narrower than and spatially overlapping with, at least in part, a beam of the one or more beams associated with the TCI state.

In some examples of the method, apparatuses, and non-transitory computer-readable medium described herein, transmitting the one or more reference signals may include operations, features, means, or instructions for transmitting the one or more reference signals via a set of resources associated with a set of multiple beams, the set of multiple beams including a beam of the one or more beams associated with the TCI state and one or more beams neighboring the beam.

Some examples of the method, apparatuses, and non-transitory computer-readable medium described herein may further include operations, features, means, or instructions for receiving a message indicating that a beam management mode may be tuned on, where determining that the UE may be to participate in the beam management procedure may be based on the beam management mode being on, where the message may be received via radio resource control signaling, downlink control information signaling, or medium access control element signaling.

In some examples of the method, apparatuses, and non-transitory computer-readable medium described herein, participating in the beam management procedure may include operations, features, means, or instructions for participating in the beam management procedure periodically, semi-statically, or aperiodically based on a beam management procedure configuration.

In some examples of the method, apparatuses, and non-transitory computer-readable medium described herein, the TCI state indicates a common beam for one or more uplink signal types, one or more downlink signal types, or a combination thereof.

A method for wireless communications at a base station is described. The method may include transmitting, to a UE, in a downlink control information message, an indication to update a TCI state associated with a communications channel between the UE and the base station, determining to participate in a beam management procedure involving one or more beams associated with the TCI state, and participating in the beam management procedure through communication, with the UE, of one or more reference signals on the one or more beams associated with the TCI state.

An apparatus for wireless communications at a base station is described. The apparatus may include a processor, memory coupled with the processor, and instructions stored in the memory. The instructions may be executable by the processor to cause the apparatus to transmit, to a UE, in a downlink control information message, an indication to update a TCI state associated with a communications channel between the UE and the base station, determine to participate in a beam management procedure involving one or more beams associated with the TCI state, and participate in the beam management procedure through communication, with the UE, of one or more reference signals on the one or more beams associated with the TCI state.

Another apparatus for wireless communications at a base station is described. The apparatus may include means for transmitting, to a UE, in a downlink control information message, an indication to update a TCI state associated with a communications channel between the UE and the base station, means for determining to participate in a beam management procedure involving one or more beams associated with the TCI state, and means for participating in the beam management procedure through communication, with the UE, of one or more reference signals on the one or more beams associated with the TCI state.

A non-transitory computer-readable medium storing code for wireless communications at a base station is described. The code may include instructions executable by a processor to transmit, to a UE, in a downlink control information message, an indication to update a TCI state associated with a communications channel between the UE and the base station, determine to participate in a beam management procedure involving one or more beams associated with the TCI state, and participate in the beam management procedure through communication, with the UE, of one or more reference signals on the one or more beams associated with the TCI state.

In some examples of the method, apparatuses, and non-transitory computer-readable medium described herein, participating in the beam management procedure may include operations, features, means, or instructions for transmitting the one or more reference signals associated with the TCI state, the one or more reference signals being CSI-RSs.

In some examples of the method, apparatuses, and non-transitory computer-readable medium described herein, transmitting the one or more reference signals may include operations, features, means, or instructions for transmitting the one or more reference signals via a beam of the one or more beams associated with the TCI state.

In some examples of the method, apparatuses, and non-transitory computer-readable medium described herein, transmitting the one or more reference signals may include operations, features, means, or instructions for transmitting the one or more reference signals via a set of multiple narrow beams that may be each narrower than and spatially overlapping with, at least in part, a beam of the one or more beams associated with the TCI state.

In some examples of the method, apparatuses, and non-transitory computer-readable medium described herein, transmitting the one or more reference signals may include operations, features, means, or instructions for transmitting the one or more reference signals via a set of multiple beams, the set of multiple beams including a beam of the one or more beams associated with the TCI state and one or more beams neighboring the beam.

Some examples of the method, apparatuses, and non-transitory computer-readable medium described herein may further include operations, features, means, or instructions for transmitting a message indicating a beam configuration for receiving the one or more reference signals, the message transmitted via radio resource control signaling, downlink control information signaling, or medium access control element signaling.

In some examples of the method, apparatuses, and non-transitory computer-readable medium described herein, the beam configuration includes a mapping of the TCI state to one of a CSI report configuration or a CSI trigger state, a set of resources for transmitting the one or more reference signals based on the mapping.

Some examples of the method, apparatuses, and non-transitory computer-readable medium described herein may further include operations, features, means, or instructions for receiving a CSI report on a set of resources, the CSI report including a reference signal received power, a signal-to-noise-plus-interference ratio, or a combination thereof based on the one or more reference signals and determining whether to update the TCI state based on the CSI report.

In some examples of the method, apparatuses, and non-transitory computer-readable medium described herein, participating in the beam management procedure may include operations, features, means, or instructions for receiving the one or more reference signals associated with the TCI state, the one or more reference signals being SRSs.

In some examples of the method, apparatuses, and non-transitory computer-readable medium described herein, receiving the one or more reference signals may include operations, features, means, or instructions for receiving the one or more reference signals via a resource associated with a beam of the one or more beams associated with the TCI state.

In some examples of the method, apparatuses, and non-transitory computer-readable medium described herein, the resource may be based on a predefined rule associated with the TCI state or based on a message transmitted to the UE, the message including a SRS resource indicator associated with the TCI state.

In some examples of the method, apparatuses, and non-transitory computer-readable medium described herein, receiving the one or more reference signals may include operations, features, means, or instructions for receiving the one or more reference signals via a set of resources, the set of resources associated with a set of multiple narrow beams that may be each narrower than and spatially overlapping with, at least in part, a beam of the one or more beams associated with the TCI state.

In some examples of the method, apparatuses, and non-transitory computer-readable medium described herein, receiving the one or more reference signals may include operations, features, means, or instructions for receiving the one or more reference signals via a set of resources associated with a set of multiple beams, the set of multiple beams including a beam of the one or more beams associated with the TCI state and one or more beams neighboring the beam.

Some examples of the method, apparatuses, and non-transitory computer-readable medium described herein may further include operations, features, means, or instructions for determining to turn on a beam management mode, where determining that the base station may be to participate in the beam management procedure may be based on the beam management mode being on and transmitting a message indicating that the beam management mode may be tuned on, where the message may be transmitted via radio resource control signaling, downlink control information signaling, or medium access control element signaling.

DETAILED DESCRIPTION

Figure 1:
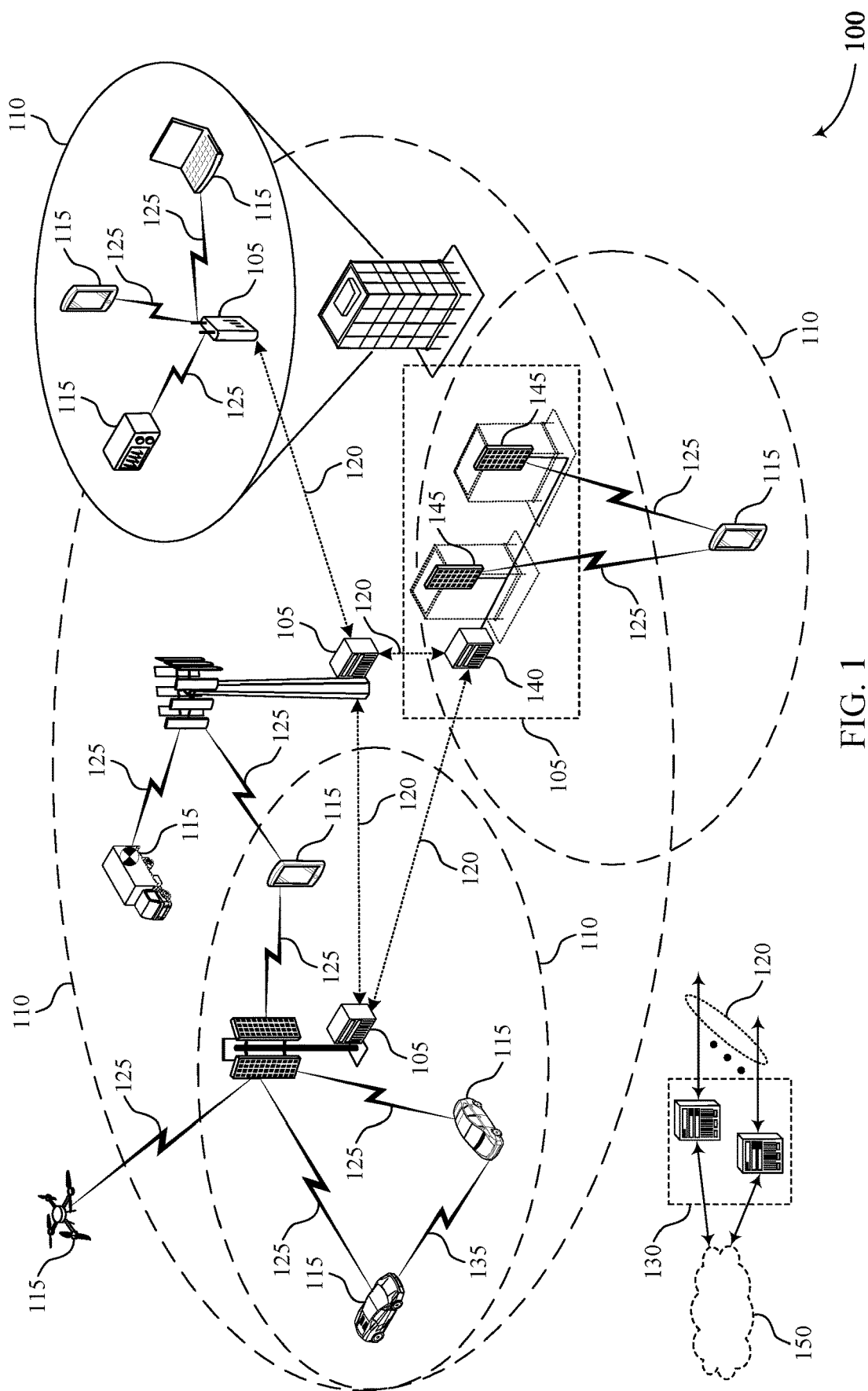
FIG. 1 illustrates an example of a wireless communications system that supports techniques for managing a transmission configuration indicator (TCI) state in accordance with aspects of the present disclosure.

In some wireless communications systems, a user equipment (UE) and a base station may communicate using one or more beams (e.g., communication beams, shaped using beamforming techniques). For example, the UE may use a transmit beam (e.g., an uplink transmit beam) for transmitting information (e.g., control information) or data to the base station, and the UE may use a receive beam (e.g., a downlink receive beam) to receive information (e.g., control information) or data from the base station. In some cases, the base station may indicate which beams a UE may use for the communications between the UE and base station by transmitting an indication of one or more transmission configuration indicator (TCI) states, where each TCI state may be associated with a beam (e.g., a communications channel). For example, the base station may transmit a first downlink control information (DCI) message including an indication of a TCI state (e.g., a unified TCI state, a common TCI state) which may configure the UE to use one or more common beams for communicating over uplink channels (e.g., physical uplink control channels (PUCCHs), physical uplink shared channels (PUSCHs)), uplink reference signals (e.g., sounding reference signals (SRSs)), downlink channels (e.g., physical downlink control channels (PDCCHs), physical downlink shared channels (PDSCHs)), downlink reference signals (e.g., channel state information (CSI) reference signals (RSs)), or a combination thereof. In some cases, the UE may be configured to use the TCI state until the UE receives a second DCI message indicating a second TCI state or updated TCI state. In some cases, the base station may transmit the second DCI message after a time interval which, in some cases, may be relatively long and in some cases, one or more communication parameters and/or the environment may change such that the first TCI state may become unreliable (e.g., outdated, not preferred) before the UE receives the second DCI message. As such, the UE may communicate with the base station according to a TCI state that may be insufficient for current communications conditions, for example, using beams associated with poor signal quality, thereby decreasing channel throughput, and reducing communication fidelity.

Techniques are described herein to support managing a TCI state based on a beam management procedure. For example, the base station may transmit a message (e.g., DCI message) indicating a TCI state (e.g., a unified TCI state, a common TCI state), such as an updated TCI state, to be used by the UE. In some cases, the indication of the TCI state may trigger (e.g., implicitly, or explicitly) the UE to perform a beam management procedure. For example, the indication may trigger the UE to monitor for one or more reference signals (e.g., CSI-RSs) on one or more beams associated with the updated TCI state and perform beam measurements (e.g., reference signal received power (RSRP) measurements, signal-to-noise-plus-interference (SINR) ratio measurements) on the one or more received reference signals. In some examples, the UE may receive the one or more reference signals on a single beam associated with the updated TCI state, one or more narrow beams within the beam associated with the updated TCI state, one or more beams neighboring (e.g., pointing in directions proximal to that of) the beam associated with the updated TCI state, or any other beam associated with downlink reference signals at the UE. In some cases, the UE may be triggered to transmit a beam measurement report (e.g., CSI report) indicating the measurements. In some cases, the UE may perform a beam refinement procedure to update the TCI state based on the measurements.

In some cases, the indication of the updated TCI state may trigger the UE to transmit one or more SRSs to the base station. That is, the base station may transmit the indication of the updated TCI state, where upon reception of the indication, the UE may transmit one or more SRSs to the base station over one or more beams associated with the updated TCI state. In some examples, the UE may transmit the SRSs on a single beam associated with the updated TCI state, one or more narrow beams within the beam associated with the updated TCI state, one or more beams neighboring (e.g., pointing in directions proximal to that of) the beam associated with the updated TCI state, or any other beam associated with downlink reference signals at the UE. The base station may receive the SRSs and may identify one or more beams or beam modifications for subsequent communications with the UE.

In some examples, the base station may configure whether the indication of the updated TCI state triggers a beam management procedure. For example, the base station may transmit a message to the UE indicating that a beam management mode is on (e.g., activated), and as such, the indication of the updated TCI state may trigger the UE to perform a beam management procedure. In other cases, the base station may transmit a message to the UE indicating that a beam management mode is off (e.g., deactivated), and as such, the indication of the updated TCI state may not trigger the UE to perform a beam management procedure.

In some cases, the beam management procedure performed by the UE may be based on the updated TCI state. For example, a common TCI state may be uplink specific where the UE may use the TCI state for multiple uplink channels and/or reference signals (e.g., PUSCH, PUCCH). In another example, the common TCI state may be downlink specific where the UE may use the TCI state for multiple downlink channels and/or reference signals (e.g., PDSCH, PDCCH), or the common TCI state may be used for uplink and downlink channels such as for PDSCH and PUSCH, in one example. As such, if the updated TCI state is an uplink common TCI state, and the indication of the updated TCI state triggered a beam management procedure, the UE may be configured to transmit one or more SRSs on one or more beams associated with the updated uplink common TCI state. If the updated TCI state is a downlink common TCI state, and the indication of the updated TCI state triggered a beam management procedure, the UE may be configured to receive one or more CSI-RSs on one or more beams associated with the updated downlink common TCI state.

Particular aspects of the subject matter described herein may be implemented to realize one or more advantages. The techniques described herein may provide for a UE and/or base station to efficiently manage one or more TCI states of a UE, which may improve communication reliability between the UE and base station, and reduce signaling overhead. As such, supported techniques may include improved network operations and, in some examples, may promote network efficiencies, among other benefits.

Aspects of the disclosure are initially described in the context of wireless communications systems. Aspects are the described with respect to a process flow. Aspects of the disclosure are further illustrated by and described with reference to apparatus diagrams, system diagrams, and flowcharts that relate to techniques for managing a TCI state.

FIG. 1 illustrates an example of a wireless communications system 100 that supports techniques for managing a TCI state in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a UE 115 and a base station 105 may communicate using one or more beams. In some cases, the base station 105 may indicate which beams a UE 115 may use for the communications between the UE 115 and base station 105 by transmitting an indication of one or more TCI states, where each TCI state may be associated with a beam.

In some examples, the base station 105 may transmit a message indicating a TCI state, such as an updated TCI state, to be used by the UE 115. In some cases, the indication of the TCI state may trigger (e.g., implicitly, or explicitly) the UE 115 to perform a beam management procedure. For example, the indication may trigger the UE 115 to monitor for one or more reference signals on one or more beams associated with the updated TCI state and perform beam measurements on the one or more received reference signals. In some cases, the indication of the updated TCI state may trigger the UE 115 to transmit one or more SRSs to the base station 105. The base station 105 may receive the SRSs and may determine whether to update the TCI state at the UE 115, thereby providing the UE 115 with an updated TCI state associated with a beam with a channel quality sufficient for communications between the UE 115 and the base station 105.

Figure 2A:
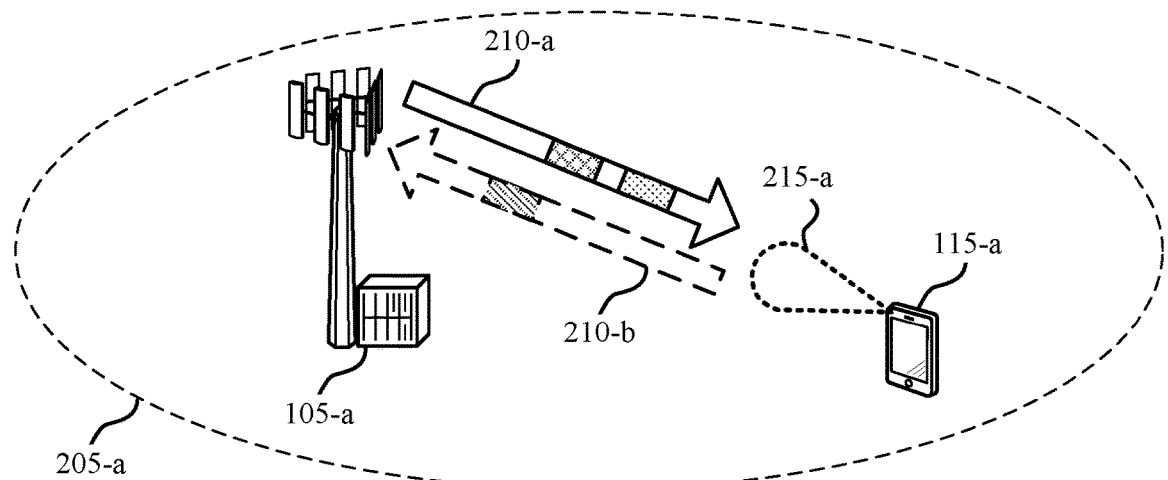
FIGS. 2A and 2B illustrate examples of wireless communications systems that support techniques for managing a TCI state in accordance with aspects of the present disclosure.
Figure 2B:
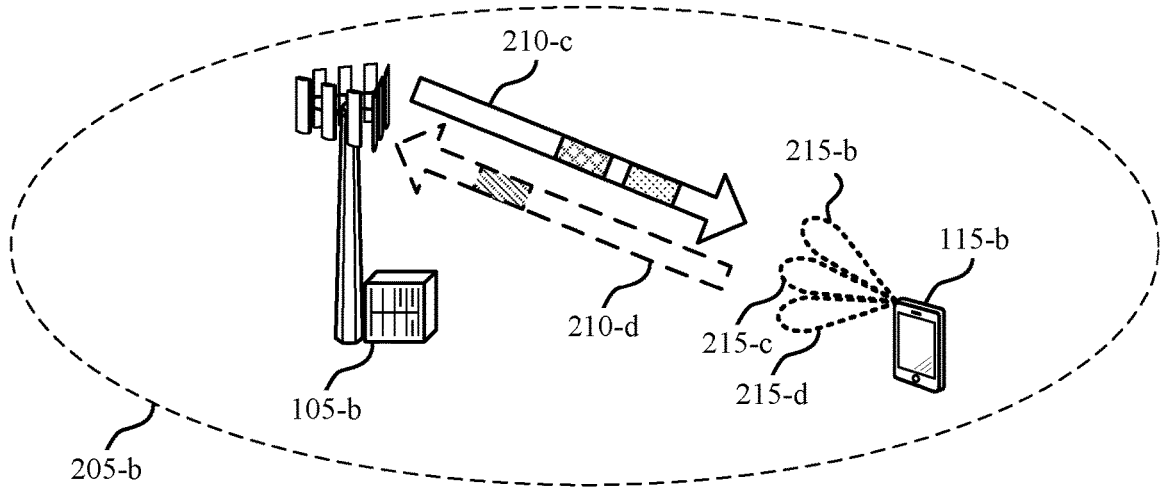

FIGS. 2A and 2B illustrate examples of wireless communications systems 200 and 201, respectively that support managing a TCI state in accordance with aspects of the present disclosure. In some examples, wireless communications system 200, wireless communications system 201, or both, may be examples of wireless communications system 100 as described with reference to FIG. 1. For example, wireless communications systems 200 and 201 may include base stations 105-a and 105-b and UEs 115-a and 115-b which may be examples of corresponding devices as described with reference to FIG. 1.

In some examples, a UE 115 may be within a coverage area 205 corresponding to (e.g., served by) a base station 105 such that the UE 115 may perform communications with the base station 105. For example, the UE 115 may be configured to communicate with the base station 105 using one or more communication links 210 which, in some cases, may be uplink communication links (e.g., to transmit uplink information to the base station 105), downlink communication links (e.g., to receive downlink information from the base station 105), or both.

To communicate over the one or more communication links 210, the UE 115 may be configured to use one or more beams 215 (e.g., communication beams 215, formed using beamforming techniques) which may allow the UE 115 to transmit and receive information directionally. In some cases, the UE 115 may communicate uplink information with a first beam 215 (e.g., an uplink transmit beam 215) and receive downlink information with a second beam 215 (e.g., a downlink receive beam 215). The first beam 215 and the second beam 215 may be the same beam 215 or may be different beams 215. In some cases, the UE 115 may be configured to communicate using a beam 215 in accordance with a TCI state. In some examples, TCI states may be associated with beam configurations at a communication device (e.g., UE 115) such that when UE 115 receives an indication of a TCI state, the UE 115 may update (or change) the beam 215 the UE 115 may use to communicate with the base station 105. For example, base station 105 may transmit an indication of one or more updated TCI states to the UE 115, configuring the UE 115 to update (or change) one or more communication beams 215. In some cases, the base station 105 may transmit a message (e.g., a radio resource control (RRC) message, DCI message, medium access control (MAC) control element (MAC-CE) message, or something other message) to the UE 115 including an indication of a TCI state. In some cases, TCI state types may vary such that different TCI state types may configure communication beams 215 differently.

In some examples, the indicated TCI state may be a common TCI state (e.g., a unified TCI state) that the UE 115 may use to communicate over one or more uplink channels (e.g., PUCCHs, PUSCHs), uplink reference signals (e.g., SRSs), one or more downlink channels (e.g., PDCCHs, PDSCHs), downlink reference signals (e.g., CSI-RSs), or a combination thereof. For example, the base station 105 may transmit the TCI state indication to the UE 115 including a downlink common TCI state that may configure the UE 115 to use a beam 215 (e.g., a common beam 215) for at least two downlink channels (e.g., PDSCH, PDCCH), downlink reference signals 225, or a combination thereof. That is, the UE 115 may receive the indication of the downlink common TCI state and may use a single beam 215 for multiple types of downlink communications in accordance with the downlink common TCI state. In another example, the base station 105 may transmit the TCI state indication to the UE 115 including an uplink common TCI state that may configure the UE 115 to use a beam 215 (e.g., a common beam 215) for at least two uplink channels (e.g., PUSCH, PUCCH), uplink reference signals, or a combination thereof. In other words, the UE 115 may receive the indication of the uplink common TCI state and may use a single beam 215 for multiple types of uplink communications in accordance with the uplink common TCI state. In yet another example, the base station 105 may transmit the TCI state indication to the UE 115 including a joint uplink-downlink common TCI state that may configure the UE 115 to use a beam 215 (e.g., a common beam 215) for at least one downlink channel (e.g., PDSCH, PDCCH), transmission of one or more downlink reference signals 225, or a combination thereof, and at least one uplink channel (e.g., PUSCH, PUCCH), transmission of one or more uplink reference signals, or a combination thereof. The joint uplink-downlink common TCI state may configure the UE 115 to use the same beam 215 for both uplink and downlink communications. In some implementations, the UE 115 may receive an indication, be configured with, or otherwise determine which types of downlink and/or uplink communications (e.g., PDSCH, PDCCH, PUSCH, PUCCH, CSI-RS, SRS, DMRS) the UE 115 may perform over a beam 215 associated with an indicated common TCI state. Additionally or alternatively, the base station 105 may transmit the TCI state indication to the UE 115 via UE-specific resources. Specifically, in some cases, the base station 105 may transmit the indication via a layer 1 (L1) unicast message (e.g., a DCI message) to indicate an updated (or active) common TCI state.

In some cases, upon receiving the indication of a TCI state, the UE 115 may be configured to communicate using a beam 215 in accordance with the indicated TCI state after a duration (e.g., an indicated duration, a preconfigured duration). In some cases, the UE 115 may be configured to use an indicated TCI state after a duration (e.g., a number of slots, a number of symbols, a number of seconds, milliseconds, microseconds, etc.) after the UE 115 receives the indication (e.g., the duration begins after the TCI state indication is received). For example, the UE 115 may receive the TCI state indication (e.g., a separate TCI state, a common TCI state), wait the duration, and upon completion of the duration, the UE 115 may use the indicated TCI state. In some cases, the UE 115 may be configured to use the indicated state after a duration following an acknowledgement of the TCI state indication. For example, the UE 115 receive a TCI state indication, and in response, may transmit an acknowledgement message indicating that the UE 115 successfully received and decoded the TCI state indication. Upon transmitting the acknowledgement message, the UE 115 may wait the duration, and upon completion of the duration, the UE 115 may use the TCI state to communicate (e.g., the duration begins after the UE 115 transmits the acknowledgment message).

In some implementations, the message indicating the TCI state (e.g., a DCI message), may indicate a TCI state for each scheduled communication (e.g., a PDSCH transmission), such that the UE 115 may not use the TCI state for any other communication than the associated scheduled communication. To reduce signaling overhead, rather than indicate a TCI state for each scheduled PDSCH, the DCI may indicate a TCI state (e.g., a sticky TCI state) to be used by the UE 115 until further notice (e.g., until the UE 115 receives another message indicating a TCI state, such as a new TCI state, or updated TCI state). For example, a UE 115 may be configured with a common TCI state as indicated in a first DCI message until the base station 105 transmits a second DCI message updating the TCI state at the UE 115. In some examples, a time period between the first DCI message and the second DCI message may be relatively long and as such one or more communication parameters, the communication environment, or the like, may change before the UE 115 receives the second DCI message. For example, during a time between TCI state updates, one or more communication parameters such as channel quality, relative beam direction, doppler shift or any other communication parameter, may change and as such, one or more beams 215 being used by the UE 115 may become insufficient (e.g., outdated, not preferred) for communication between the UE 115 and the base station 105. In another example, during a time between TCI state updates, the communication environment may change, for example, due to proximal interference sources such as other UEs 115, physical blockages, or the like, entering the communication environment. Additionally or alternatively, the UE 115 may change locations and enter a communication environment such that the TCI state used by the UE 115 may become unreliable (e.g., outdated, not preferred). As such, the UE 115 may communicate with the base station 105 according to a TCI state that may be insufficient for current communication conditions, until the UE 115 receives a message indicate an updated TCI state (e.g., second DCI message).

To support managing a TCI state (e.g., to reduce the use of an outdated or non-preferred TCI state), the UE 115 may be configured to participate in a beam management procedure in response to receiving an indication of a TCI state (e.g., a DCI message indicating an updated TCI state), thereby enabling a UE 115 and/or base station 105 to timely manage one or more TCI states at the UE 115. For example, the base station 105 may transmit a TCI state indication 220 (e.g., indicating a new TCI state, updated TCI state) and the TCI state indication 220 may trigger (e.g., implicitly, or explicitly) the UE 115 to perform a beam management procedure. In some cases, the beam management procedure performed by the UE 115 may be based on the type of TCI state that the UE 115 is configured to use (e.g., update). For example, (as described with reference to FIGS. 2A and 2B), if the UE 115 is configured with a TCI state associated with downlink communications (e.g., a separate downlink common TCI state, a downlink TCI state, a joint downlink/uplink common TCI state), the UE 115 may be configured to monitor for reference signals (e.g., CSI-RSs) from the base station 105 over one or more beams 215 associated with the TCI state. In some cases, the UE 115 may measure the received reference signals and transmit a report (e.g., a CSI report) indicating the measurements or may perform a beam refinement procedure based on the measurements. In another example (as described with reference to FIGS. 3A and 3B), if the UE 115 is configured with a TCI state associated with uplink communications (e.g., a separate uplink common TCI state, an uplink TCI state, a joint downlink/uplink common TCI state), the UE 115 may be configured to transmit reference signals (e.g., SRSs) to the base station 105 over one or more beams 215 associated with the TCI state.

Wireless communications systems 200 and 201 may support updating TCI states associated with downlink communications (e.g., common downlink TCI states, joint uplink-downlink TCI states), and in some cases, performing a beam management procedure. In some implementations, a UE 115 may be configured to perform a beam management procedure using a single beam associated with a TCI state, as described with reference to FIG. 2A. In some implementations, a UE 115 may be configured to perform a beam management procedure using multiple beams associated with a TCI state, as described with reference to FIG. 2B.

For example, with reference to FIG. 2A, UE 115-a may be configured to perform a beam management procedure in response to receiving TCI state indication 220-a, where TCI state indication 220-*a* may be associated with updating a TCI state related to downlink communications, such that the TCI state indication 220-*a* may indicate a separate downlink common TCI state, a joint uplink-downlink TCI state, or a downlink TCI state. That is, base station 105-*a* may transmit TCI state indication 220-*a* to UE 115-*a* (e.g., via communications link 210-*a*), where TCI state indication 220-*a* may trigger UE 115-*a* to perform a beam management procedure in accordance with the indicated TCI state.

In some examples, TCI state indication 220-*a* may trigger UE 115-*a* to monitor for downlink reference signals 225-*a*. In some cases, TCI state indication 220-*a* may explicitly (e.g., within a TCI state updating DCI, a MAC-CE, or the like) trigger UE 115-*a* to monitor for downlink reference signals 225-*a*. For example, TCI state indication 220-*a* may include an explicit indication for UE 115-*a* to monitor for downlink reference signals 225-*a*. In some examples, UE 115-*a* may identify which downlink reference signals 225-*a* to monitor for based on TCI state indication 220-*a*. In some examples, UE 115-*a* may receive an indication of a mapping of a TCI state (e.g., a TCI state IE) to a CSI report configuration (e.g., CSI-report Config). In some cases, UE 115-*a* may be configured with a set of mappings, where each mapping in the set may associate a TCI state with a CSI report configuration. UE 115-*a* may receive an indication of a mapping or a set of mappings in RRC signaling, DCI signaling, or MAC-CE signaling. For example, UE 115-*a* may be configured with a mapping or a set of mappings via RRC signaling, and may receive updates to the mappings via DCI signaling, or MAC-CE signaling, or both. In some implementations, the TCI state IE may be different than a TCI state indication 220. In some cases, the TCI state IE may be preconfigured in RRC signaling, and the TCI state indication 220 may be included in DCI, MAC-CE, or both to activate or select one of the preconfigured TCI states (e.g., a TCI state IE). In some implementations, the mapping of the indicated TCI state to a CSI report configuration may be associated with (e.g., indicated inside of) a TCI state IE in RRC. In another example, the mapping may be associated with (e.g., indicated inside of) an IE different from the TCI state IE. In other examples, the mapping may be dynamically indicated via a MAC-CE message or a DCI message.

In some cases, TCI state indication 220-*a* may map the indicated TCI state to a CSI report configuration. For example, TCI state indication 220-*a* may associate the indicated TCI state with a report configuration parameter (e.g., CSI-ReportConfig). The report configuration parameter may be associated with (or may include parameters corresponding to) determination of CSI-RSs, CSI-RS resources, CSI-RS resource configurations (e.g., with CSI-ResourceConfig), one or more reporting metrics, or the like, at UE 115-*a*. In some examples, the report configuration parameter may include a link to a measurement configuration parameter (e.g., CSImeasurementconfig), which may indicate one or more downlink reference signals 225-*a* (e.g., SSBs, CSI-RSs) that UE 115-*a* may measure. In some examples, the link may be indicated via an RRC message. For example, the link may be associated with (indicated inside of) an information element (IE) used to indicate the TCI state. In another example, the link may be associated with (indicated inside of) an IE different from the IE used to indicate the TCI state. In other examples, the link may be dynamically indicated via a MAC-CE message or a DCI message. For example, base station 105-*a* may transmit a message (e.g., a MAC-CE message activating a TCI state or a DCI message indicating the TCI state), where the message may indicate one or more candidate report configuration identifiers corresponding to one or more local indices associated with downlink reference signals 225-*a*. In one example, base station 105-*a* may transmit, to UE 115-*a*, a DCI message indicating one or more candidate resource configuration identifiers (e.g., reportConfig ID #5, #10, and #16) associated with an indicated TCI state, where the DCI message may map the candidate resource configuration identifiers to one or more respective local indices (e.g., indices #0, #1, and #2) which may be used by UE 115-*a* to identify one or more downlink reference signals 225-*a* (e.g., CSI-RSs).

In some examples, base station 105-*a* may indicate an aperiodic downlink reference signal 225-*a* configuration. For example, within a trigger state IE (e.g., within a DCI message updating a TCI state, a MAC-CE activating a TCI state, or an RRC message indicating a TCI state), base station 105-*a* may indicate an associated report configuration information parameter (e.g., CSI-AssociatedReportConfigInfo) to define the aperiodic downlink reference signal 225-*a* configuration. The trigger state IE may be an IE defined in RRC. The link from a TCI state to a trigger state may also be configured in RRC, and updated dynamically by MAC-CE, DCI, or both. The trigger state IE may also contain a subfield (e.g., CSI-AssociatedReportConfigInfo), which may define a report configuration of a reference signal (e.g., aperiodic reference signal). When the UE 115 receives a beam indication of a TCI state, the UE 115 may search for a linked trigger state. If a trigger state is linked to the indicated TCI state, then the base station 105 may transmit the reference signal based on the trigger state configuration. The UE 115 may also report the measurement based on the reference signal (e.g., aperiodic reference signal) based on the associated report configuration (e.g., AssociatedReportConfig). The link from a TCI state to a trigger state may be indicated in DCI/MAC-CE. As such, base station 105-*a* may indicate a link between an indicated TCI state and a trigger state (e.g., the trigger state IE) within an RRC message (e.g., within a TCI state IE or within an IE different from the TCI state IE). Additionally or alternatively, base station 105-*a* may indicate the link between an indicated TCI state and a trigger state dynamically, (e.g., via a MAC-CE or a DCI message).

In other cases, UE 115-*a* may be pre-configured to monitor for downlink reference signals 225-*a* based on a TCI state (e.g., a downlink TCI state, a unified TCI state, or the like) indicated by TCI state indication 220-*a*. In other words, TCI state indication 220-*a* may implicitly trigger UE 115-*a* to monitor for downlink reference signals 225-*a*. For example, if UE 115-*a* receives TCI state indication 220-*a* and identifies that the type of TCI indicated by TCI state indication 220-*a* is associated with downlink communications, UE 115-*a* may monitor for downlink reference signals 225-*a*, such that TCI state indication 220-*a* does not include a separate indication for UE 115-*a* to perform a beam management procedure. In some examples, UE 115-*a* may identify which downlink reference signals 225-*a* to monitor based on a source reference signal associated with the indicated TCI state. For example, base station 105-*a* may transmit a tracking reference signal (TRS) to UE 115-*a* associated with a downlink TCI state (e.g., a PDSCH TCI state). UE 115-*a* may determine that the TRS may be the source reference signal and may identify downlink reference signals 225-*a* therewith. For example, the TRS may be associated with resources UE 115-*a* may use to monitor for downlink reference signals 225-*a*.

In wireless communications system 200, after transmitting TCI state indication 220-*a*, base station 105-*a* may transmit one or more downlink reference signals 225-*a* (e.g., CSI-RSs) on one or more beams 215 associated with the updated TCI state. In some examples, downlink reference signals 225-*a* may be quasi co-located (QCLed) with downlink communications between UE 115-*a* and base station 105-*a*. UE 115-*a* may receive downlink reference signals 225-*a* and may perform beam measurements (e.g., RSRP measurements, SINR measurements) on the received downlink reference signals 225-*a*. In some cases, UE 115-*a* may be configured to receive downlink reference signals 225-*a* on a single beam 215 associated with the updated TCI state, such as beam 215-*a*. In some cases, beam 215-*a* may be the beam 215 indicated by the TCI state, a narrow beam 215 within the beam indicated by the updated TCI state, a beam 215 neighboring the updated TCI state, or any other beam 215 associated with downlink reference signals 225-*a*. In some examples, beam 215-*a* may be configured by base station 105-*a* in an RRC message, a MAC-CE, a DCI message, or the like.

In some examples, UE 115-*a* may be triggered to transmit measurement report 230-*a* (e.g., a CSI report) indicating the measurements performed on downlink reference signals 225-*a*. For example, TCI state indication 220-*a* may trigger UE 115-*a* to perform the measurements on downlink reference signals 225-*a* (e.g., using beam 215-*a*) and may also trigger UE 115-*a* to transmit measurement report 230-*a* indicating the measurements to base station 105-*a*. In some examples, base station 105-*a* may transmit a DCI message (e.g., DCI format 0_1, DCI format 0_2), to UE 115-*a*, where the DCI message may include a field to trigger a CSI report. For example, base station 105-*a* may transmit TCI state indication 220-*a* as a DCI message, where TCI state indication 220-*a* may include a field to indicate associated measurement report 230-*a*. UE 115-*a* may transmit measurement report 230-*a* as an L1-RSRP report, a SINR report, a CSI report, or any combination thereof. UE 115-*a* may transmit measurement report 230-*a* on resources preconfigured at UE 115-*a*, resources indicated by base station 105-*a* (e.g., for transmitting measurement report 230-*a*), or a combination thereof. In some examples, base station 105-*a* may configure UE 115-*a* to perform the measurements on downlink reference signals 225-*a*, send measurement report 230-*a*, or both, periodically, semi-persistently, aperiodically, or the like.

In some cases, UE 115-*a* may perform a beam refinement procedure to update the TCI state based on the measurements. For example, UE 115-*a* may perform the measurements based on downlink reference signals 225-*a* and determine whether to update beam 215-*a* associated with the indicate TCI. UE 115-*a* may determine to update (e.g., adjust) one or more parameters associated with the indicated TCI state to update beam 215-*a*. In some case, UE 115-*a* may be configured to do nothing based on the measurements and/or based on an indication from base station 105-*a* for UE 115-*a* to do nothing. For example, UE 115-*a* may perform the measurements based on downlink reference signals 225-*a* and determine not to do anything with the measurements (e.g., refrain from performing a beam refinement procedure, refrain from transmitting a beam measurement report).

In some cases, base station 105-*a* may determine the beam management procedure for UE 115-*a* to perform. For example, the TCI indication 220-*a*, or some other message, may indicate (e.g., explicitly) a beam management procedure for UE 115-*a* to perform. For example, the message may include an indication configuring UE 115-*a* to perform measurements of downlink reference signals 225-*a* and may enable UE 115-*a* to perform a beam refinement procedure. In another example, the message may include an indication configuring UE 115-*a* to perform measurements of downlink reference signals 225-*a* and may enable UE 115-*a* to transmit a measurement report to base station 105-*a*.

In another example, with reference to FIG. 2B, UE 115-*b* may be configured to perform a beam management procedure in response to receiving TCI state indication 220-*b*, where UE 115-*b* may perform the beam management procedure to manage a TCI state related to downlink communications. That is, base station 105-*b* may transmit TCI state indication 220-*b* to UE 115-*b*, where TCI state indication 220-*b* may trigger UE 115-*b* to perform the beam management procedure. In some examples, base station 105-*b* may transmit TCI state indication 220-*b*, explicitly triggering UE 115-*b* to perform the beam management procedure. As such, in some cases, UE 115-*b* may identify which downlink reference signals 225-*b* to monitor for based on TCI state indication 220-*b*. In some cases, TCI state indication 220-*b* may map the indicated TCI state to a CSI report configuration as describe in more detail with reference to FIG. 2A. In some examples, base station 105-*b* may transmit TCI state indication 220-*b*, implicitly triggering UE 115-*b* to perform the beam management procedure. As such, UE 115-*b* may identify which downlink reference signals 225-*b* to monitor based on a source reference signal (e.g., a TRS) associated with the indicated TCI state.

In wireless communications system 201, after transmitting TCI state indication 220-*b*, base station 105-*b* may transmit one or more downlink reference signals 225-*b* (e.g., CSI-RSs) on one or more beams 215 associated with the updated TCI state. In some examples, downlink reference signals 225-*b* may be quasi co-located (QCLed) with downlink communications between UE 115-*b* and base station 105-*b*. UE 115-*b* may receive downlink reference signals 225-*b* and may perform beam measurements (e.g., RSRP measurements, SINR measurements) on downlink reference signals 225-*b*. In some cases, UE 115-*b* may be configured to receive downlink reference signals 225-*b* on one or more beams 215 associated with the updated TCI state, such as beam 215-*b*, beam 215-*c*, beam 215-*d*, or any other beam 215. In some cases, any one of beams 215-*b*, 215-*c*, and 215-*d* may be the beam 215 indicated by the TCI state. In some cases, beams 215-*b*, beam 215-*c*, and beam 215-*d* may be narrow beams 215 included within the beam 215 indicated by the updated TCI state. In some cases, beam 215-*b*, beam 215-*c*, and beam 215-*d* may be neighbor beams to (e.g., be pointed in directions proximal to the direction of) a beam 215 associated with the updated TCI state, or any other beam 215 associated with downlink reference signals 225-*b*. For example, beam 215-*c* may be the beam 215 associated with the TCI state, and beams 215-*b* and 215-*d* may referred to as neighboring beams 215 to beam 215-*c*. In some examples, beam 215-*b*, beam 215-*c*, beam 215-*d*, or any combination thereof may be configured by base station 105-*b* in an RRC message, a MAC-CE message, a DCI message, or the like.

In some examples, UE 115-*b* may be triggered to transmit measurement report 230-*b* (e.g., a CSI report) indicating the measurements performed on downlink reference signals 225-*b*. In some examples, base station 105-*b* may transmit a DCI message (e.g., DCI format 0_1, DCI format 0_2), to UE 115-*b*, where the DCI message may include a field to trigger a CSI report. For example, base station 105-*b* may transmit TCI state indication 220-*b* as a DCI message, where TCI state indication 220-*b* may include a field to indicate associated measurement report 230-*b*. UE 115-*b* may transmit measurement report 230-*b* as an L1-RSRP report, an SINR report, a CSI report, or any combination thereof. UE 115-*b* may transmit measurement report 230-*b* on resources preconfigured at UE 115-*b*, resources indicated by base station 105-*b* (e.g., for transmitting measurement report 230-*b*), or a combination thereof. In some examples, base station 105-*b* may configure UE 115-*b* to perform the measurements on downlink reference signals 225-*b*, send measurement report 230-*b*, or both, periodically, semi-persistently, aperiodically, or the like.

In some cases, UE 115-*b* may perform a beam refinement procedure to update the TCI state based on the measurements, for example, using a beam 215 identified with reference signal measurements associated with a relatively high signal quality (as compared to one or more other beams 215). For example, UE 115-*b* may perform reference signal measurements with beam 215-*b*, beam 215-*c*, and beam 215-*d*, where based on the reference signal measurements, UE 115-*b* may record (or otherwise make note of) a beam 215 associated with the highest signal quality. As such, in some cases, UE 115-*b* may determine to use the beam 215 based on the beam refinement procedure. In another example, UE 115-*b* may perform the measurements based on downlink reference signals 225-*b* and determine whether to update the current TCI state. UE 115-*b* may determine to update (e.g., adjust) one or more parameters associated with the current TCI state. In some case, UE 115-*b* may be configured to do nothing based on the measurements or based on an indication from base station 105-*b* for U.S. 15-*b* to do nothing. For example, UE 115-*b* may perform the measurements based on downlink reference signals 225-*b* and determine not to do anything with the measurements (e.g., refrain from performing a beam refinement procedure, refrain from transmitting a beam measurement report).

In some cases, base station 105-*b* may determine the beam management procedure for UE 115-*b* to perform. For example, the TCI state indication 220-*b*, or some other message, may indicate (e.g., explicitly within a TCI state updating DCI, a MAC-CE, or the like) a beam management procedure for UE 115-*b* to perform. For example, the message may include an indication configuring UE 115-*b* to perform measurements of downlink reference signals 225-*b* and may enable UE 115-*b* to perform a beam refinement procedure. In another example, the message may include an indication configuring UE 115-*b* to perform measurements of downlink reference signals 225-*b* and may enable UE 115-*b* to transmit a measurement report to base station 105-*b*. In some cases, the beam management procedure that UE 115-*b* may perform may be based on a pre-configured operation for a specific TCI state. In other words, TCI state indication 220-*b* may implicitly trigger a beam management procedure at UE 115-*b*. For example, TCI state indication 220-*b* may be associated with (or may include) a resource configuration, a set of reference signal resources, and a report configuration, such that if the resource configuration, the set of reference signal resources, and report configuration are associated with the TCI state, UE 115-*b* may determine to perform measurements on downlink reference signals 225-*b* using one or more narrow beams 215 within a beam 215 indicated in TCI state indication 220-*b*, such as beam 215-*b*, beam 215-*c*, beam 215-*d*, or any other narrow beam 215 within the beam 215 indicated in TCI state indication 220-*b*. Additionally, TCI state indication 220-*b* may indicate the UE 115-*b* to transmit measurement report 230-*b* based on an association between the resource configuration, the set of reference signal resources, the report configuration, and the TCI state. In another example, TCI state indication 220-*b* may include (or may be associated with) an indication that a resource set (e.g., of UE 115-*b*, indicated by base station 105-*b*, or the like) may be configured with a repetition state being "ON." As such, UE 115-*b* may be triggered to perform a beam refinement procedure, such that UE 115-*b* may perform measurements on signals (e.g., downlink reference signals 225-*b*) and determine to use a beam 215 associated with sufficient channel conditions (e.g., relatively high signal quality as compared to the signal quality of one or more other beams 215).

Configuring a UE 115 and a base station 105 to support the techniques as described herein may allow the UE 115 to manage a TCI state which, in some cases, may realize one or more advantages including greater communication throughput, connection retention, lower communication latency, higher fidelity communications, among other benefits.

Figure 3A:
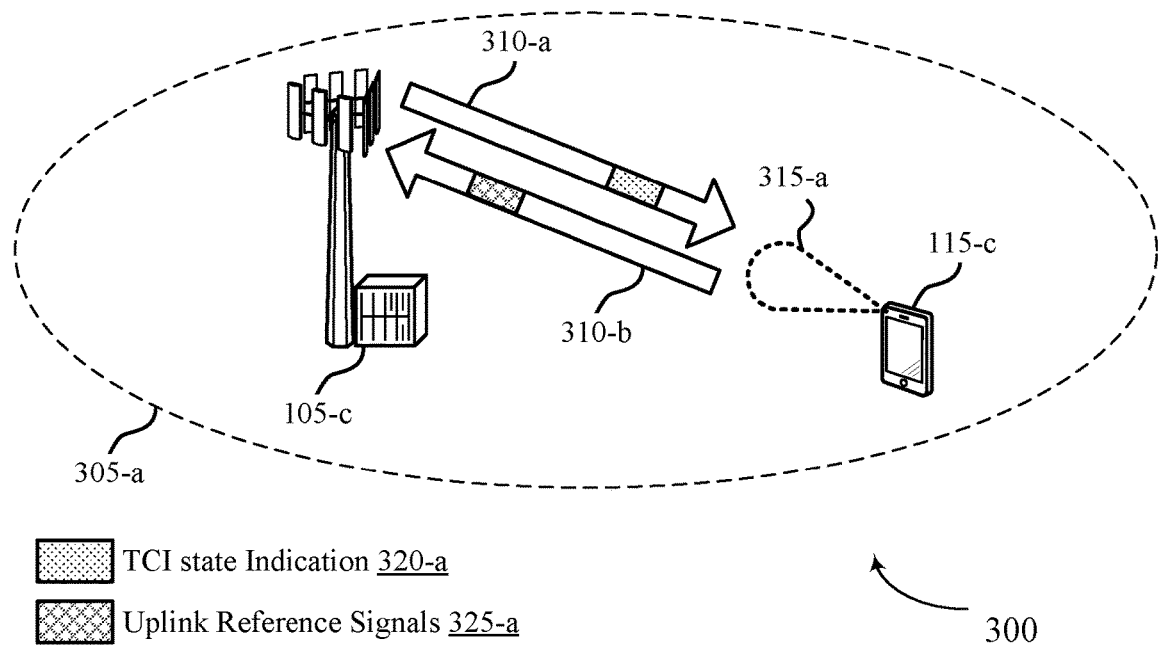
FIGS. 3A and 3B illustrate examples of wireless communications systems that support techniques for managing a TCI state in accordance with aspects of the present disclosure.
Figure 3B:
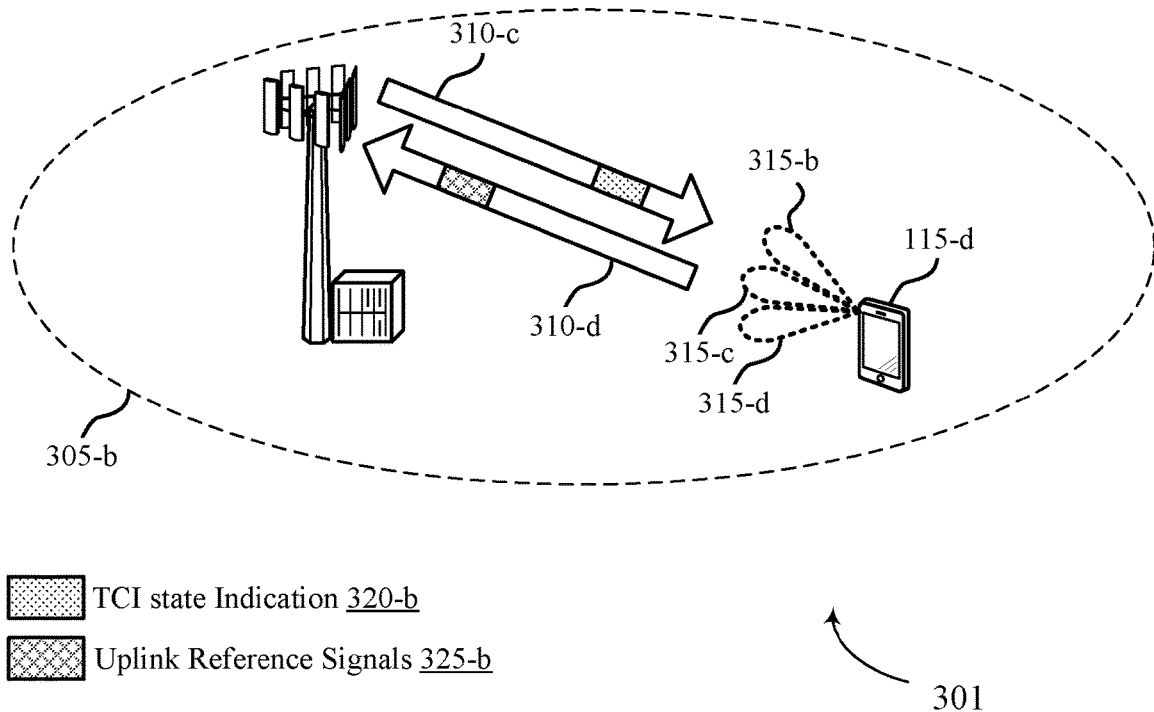

FIGS. 3A and 3B illustrate examples of wireless communications systems 300 and 301, respectively that support managing a TCI state in accordance with aspects of the present disclosure. In some examples, wireless communications system 300, wireless communications system 301, or both, may be examples of wireless communications system 100, wireless communications system 200, wireless communications system 201, or a combination thereof, as described with reference to FIGS. 1, 2A, and 2B, respectively. For example, wireless communications systems 300 and 301 may include base stations 105-*c* and 105-*d* and UEs 115-*c* and 115-*d* which may be examples of corresponding devices as described with reference to FIGS. 1, 2A, and 2B.

In some examples, a UE 115 may be within a coverage area 305 corresponding to (e.g., served by) a base station 105 such that the UE 115 may perform communications with the base station 105. For example, the UE 115 may be configured to communicate with the base station 105 using one or more communication links 310 which, in some cases, may be uplink communication links (e.g., to transmit uplink information to the base station 105), downlink communication links (e.g., to receive downlink information from the base station 105), or both.

The UE 115 may be configured to perform such communications over the one or more communications link 310 using one or more beams 315 (e.g., communication beams 215, formed using beamforming techniques) which may allow the UE 115 to transmit and receive information directionally. In some cases, the UE 115 may communicate uplink information with a first beam 315 (e.g., an uplink transmit beam 315) and receive downlink information with a second beam 315 (e.g., a downlink receive beam 315). The first beam 315 and the second beam 315 may be the same beam, or may be different beams.

In some cases, wireless communications systems 300 and 301 may be configured to support similar techniques as described with reference to FIG. 2. For example, wireless communications systems 300 and 301 may support managing a TCI state (e.g., an outdated or non-preferred TCI state) such that a UE 115 may be configured to participate in a beam management procedure in response to receiving a TCI state indication 320 (e.g., via a DCI message) updating a TCI state. Wireless communications systems 300 and 301 may support updating TCI states associated with uplink communications (e.g., common uplink TCI states, joint common uplink-downlink TCI states, uplink TCI states).

With reference to FIG. 3A, UE 115-*c* may be configured to perform a beam management procedure in response to receiving TCI state indication 320-*a* such as TCI states indications 220 as described with reference to FIG. 2.

However, TCI state indication 320-*a* as illustrated in wireless communication system 300 may be associated with updating a TCI state related to uplink communications. That is, base station 105-*c* may transmit TCI state indication 320-*a* to UE 115-*c*, where TCI state indication 320-*a* may trigger (e.g., implicitly or explicitly) UE 115-*c* to perform a beam management procedure on one or more uplink communication beams 315 associated with the indicate TCI state.

In some examples, TCI state indication 320-*a* may trigger UE 115-*c* to transmit one or more uplink reference signals 325-*a* (e.g., SRSs) to base station 105-*c*. In some cases, TCI state indication 320-*a* may explicitly trigger UE 115-*a* to transmit uplink reference signals 325-*a*. For example, TCI state indication 320-*a* may include an explicit indication for UE 115-*c* to transmit uplink reference signals 325-*a*. In some cases, base station 105-*c* may indicate one or more uplink reference signal resources (e.g., an SRS resource indicator (SRI)) associated with an indicated TCI state. For example, base station 105-*c* may indicate, to UE 115-*c*, one or more resource set indicators corresponding to one or more resources, spatial domain filters, or the like, which UE 115-*c* may use to transmit uplink reference signals 325-*a*. In some examples, base station 105-*c* may indicate one or more uplink reference signal resources within an RRC message (e.g., within a TCI state IE, or within an IE linking an indicated TCI with the uplink reference signal resources, different from the TCI state IE, SRS trigger state). In some cases, a UE 115 may be configured with a trigger state which may define one or more resource for the UE 115 to transmit an SRS. The SRS trigger state may be mapped to a TCI state, where the mapping may be preconfigured in RRC or indicated in DCI/MAC-CE, or both. The UE 115 may transmit one or more SRS based on a configuration defined by an SRS trigger state.

In other examples, base station 105-*c* may indicate one or more uplink reference signal resources within a MAC-CE message or a DCI message. For example, base station 105-*c* may transmit, to UE 115-*c*, a DCI message scheduling uplink transmissions and indicating a TCI state. The DCI message may be format 0_1, format 0_2, or the like. Base station 105-*c* may include a field within the DCI message, triggering UE 115-*c* to transmit one or more uplink reference signals 325-*a*.

In other cases, TCI state indication 320-*a* may implicitly trigger UE 115-*c* to transmit uplink reference signals 325-*a*. For example, TCI state indication 320-*a* may be configured to update a TCI state associated with uplink communications (e.g., a common uplink TCI state, a joint uplink-downlink TCI state, uplink TCI state). If UE 115-*c* identifies that the type of TCI is associated with uplink communications, UE 115-*c* may transmit uplink reference signals 325-*a* based on the implicit trigger associated with the TCI state indication 320-*a*. In some examples, UE 115-*a* may determine to transmit uplink reference signals 325-*a* based on a specific reference signal being the source reference signal associated with an updated TCI state. For example, an SRS may be the source reference signal associated with a TCI state. As such, UE 115-*c* may automatically transmit uplink reference signals 325-*a* upon reception of TCI state indication 320-*a*.

In wireless communications system 300, after transmitting TCI state indication 320-*a*, UE 115-*c* may transmit uplink reference signals 325-*a* on one or more beams 315 associated with the updated TCI state. In some cases, UE 115-*c* may be configured to transmit uplink reference signals 325-*a* on a single beam 315 associated with the updated TCI state, such as beam 315-*a*. In some cases, beam 315-*a* may be the beam 315 indicated by the TCI state, a narrow beam 315 within the beam 315 indicated by the updated TCI state, a beam 315 neighboring the beam 315 indicated by the updated TCI state, or any other beam 315 associated with uplink reference signals 325-*a*. In some examples, beam 315-*a* may be configured by base station 105-*c* in an RRC message, a MAC-CE message, a DCI message, or the like.

In some examples, UE 115-*c* may transmit uplink reference signals 325-*a* to base station 105-*a*, where each uplink reference signal 325-*a* may be transmitted via a respective beam 315. In the case illustrated in wireless communications system 300, UE 115-*c* may transmit an uplink reference signal 325-*a* using beam 315-*a*. Base station 105-*c* may receive uplink reference signals 325-*a* and may identify one or more beams 315 for subsequent communications. For example, base station 105-*c* may measure the received uplink reference signal 325-*a* and determine whether to update (e.g., adjust) the TCI state based on the measurements.

In some cases, base station 105-*c* may determine the beam management procedure for UE 115-*c* to perform. For example, a TCI state indication 320, or some other message, may include an indication of the type of beam management procedure UE 115-*c* may use. For example, the message may include an indication configuring UE 115-*a* to transmit uplink reference signals 325-*a* to base station 105-*c*.

With reference to FIG. 3B, UE 115-*d* may be configured to perform a beam management procedure in response to receiving TCI state indication 320-*b* such as TCI state indication 320-*a* as described with reference to FIG. 3A. That is, base station 105-*d* may transmit TCI state indication 320-*b* to UE 115-*d*, where TCI state indication 320-*b* may trigger UE 115-*d* to perform a beam management procedure on uplink communication beams 315.

In some examples, TCI state indication 320-*b* may trigger UE 115-*d* to transmit one or more uplink reference signals 325-*b* (e.g., SRSs) to base station 105-*d*. In some cases, TCI state indication 320-*b* may explicitly or implicitly trigger UE 115-*d* to transmit uplink reference signals 325-*b*. In some cases, base station 105-*c* may (explicitly) indicate one or more uplink reference signal resources (e.g., an SRS resource indicator (SRI)) associated with an indicated TCI state. In some examples, UE 115-*a* may (implicitly) determine to transmit uplink reference signals 325-*a* based on a specific reference signal (e.g., an SRS) being the source reference signal associated with an updated TCI state.

In wireless communications system 301, after transmitting TCI state indication 320-*b*, UE 115-*d* may transmit uplink reference signals 325-*b* on one or more beams 315 associated with the updated TCI state. In some cases, UE 115-*d* may be configured to transmit uplink reference signals 325-*b* on beam 315-*b*, beam 315-*c*, beam 315-*d*, or any combination thereof associated with the updated TCI state. In some cases, beams 315-*b*, 315-*c*, or 315-*d* may be the beam 315 indicated by the TCI state. In other cases, beam 315-*b*, beam 315-*c*, beam 315-*d*, or any combination thereof may be narrow beams 315 within the beam 315 indicated by the updated TCI state, such as beam 315-*a* as described with reference to FIG. 3A. In some cases, beam 315-*b*, beam 315-*c*, beam 315-*d*, any other beam, or any combination thereof may be beams 315 neighboring the beam 315 indicated by updated TCI state. For example, beam 315-*c* may be the beam 315 associated with the TCI state, and beams 315-*b* and 315-*d* may be referred to as neighboring beams 315 to beam 315-*c*. Additionally or alternatively, beam 315-*b*, beam 315-*c*, beam 315-*d*, or any combination thereof may be any beam associated with uplink reference signals 325-b. In some examples, beams 315-b, 315-c, and 315-d may be configured by base station 105-c in an RRC message, a MAC-CE message, a DCI message, or the like.

In some examples, UE 115-d may transmit uplink reference signals 325-b to base station 105-d, where each uplink reference signal 325-b may be transmitted via a respective beam 315. In the case illustrated in wireless communications system 301, UE 115-d may transmit a respective uplink reference signal 325-a on each of beam 315-b, beam 315-c, beam 315-d, or any combination thereof. Base station 105-d may receive uplink reference signals 325-b and may perform measurements on the received uplink reference signals 325-a (e.g., signal quality measurements, channel interference measurements). Base station 105-b may determine whether to update (e.g., adjust) the TCI state being used by UE 115-d based on the measurements. For example, in some cases, base station 105-d may identify one or more (sufficient, preferred) beams 315 for subsequent communications with UE 115-d.

In some implementations, a base station 105 (e.g., base station 105-a and base station 105-b with reference to FIGS. 2A and 2B, and base station 105-c and base station 105-d with reference to FIGS. 3A and 3B) may configure whether a TCI state indication (e.g., TCI state indication 220 with reference to FIGS. 2A and 2B, TCI state indication 320 with reference to FIGS. 3A and 3B) triggers a beam management procedure. For example, a base station 105 may transmit a message (e.g., a DCI message, an RRC message, a MAC-CE message) to a UE 115 (e.g., UEs 115-a and 115-b with reference to FIGS. 2A and 2B, UEs 115-c and 115-d with reference to FIGS. 3A and 3B) indicating that a beam management mode is on (e.g., activate), and as such, an indication of an updated TCI state (e.g., a TCI state indication 220) may trigger the UE 115 to perform a beam management procedure (e.g., uplink beam management procedure, downlink beam management procedure). In other cases, the base station 105 may transmit a message to the UE 115 indicating that a beam management mode is off (e.g., de-activated), and as such, the indication of the updated TCI state may not trigger the UE 115 to perform a beam management procedure.

Figure 4:
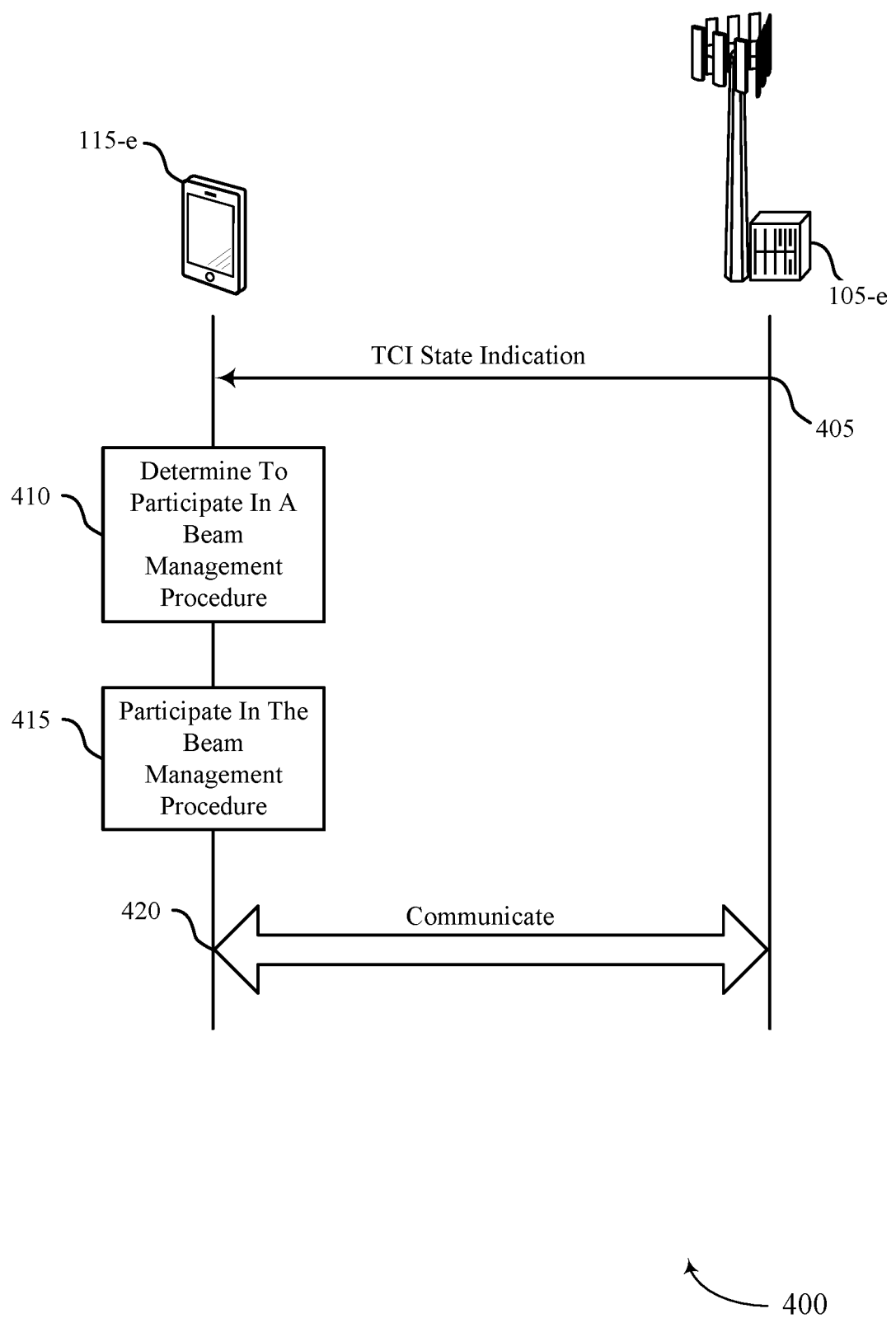
FIG. 4 illustrates an example of a process flow that supports techniques for managing a TCI state in accordance with aspects of the present disclosure.

FIG. 4 illustrates an example of a process flow 400 that supports techniques for managing a TCI state in accordance with aspects of the present disclosure. The process flow 400 may be implemented by UE 115-e and base station 105-e which may be examples of corresponding devices as described with reference to FIGS. 1 through 3B. In some examples, process flow 400 support UE 115-e and/or base station 105-e to manage a TCI state at UE 115-e so as to improve communication reliability between UE 115-e and base station 105-e. Alternative examples of the following may be implemented, where some steps are performed in a different order than described or are not performed at all. In some cases, steps may include additional features not mentioned below, or further steps may be added.

At 405, base station 105-e may transmit a TCI state indication to UE 115-e including an updated TCI state (e.g., a common TCI state, joint TCI state, unified TCI state). The TCI state indication may include an indication for UE 115-e to update a TCI state associated with a communications channel (e.g., a beam) between UE 115-e and base station 105-e. Base station 105-e may transmit the TCI state indication as (or within) a DCI message. In some cases, the TCI state indication may indicate a common beam for one or more uplink signal types (e.g., SRSs), one or more downlink signal types (e.g., CSI-RSs), or a combination thereof. UE 115-e may receive the TCI state indication and update a TCI state accordingly.

In some examples, base station 105-e may transmit a message indicating that a beam management mode is turned on. Base station 105-e may transmit the message as (or within) an RRC message, a MAC-CE message, a DCI message, such as the DCI message including the TCI state indication at 405, or the like. Such a message is described in more detail with reference to FIGS. 2 and 3.

UE 115-e may determine to update a TCI state based on receiving the TCI state indication at 405. In some examples, the TCI state indication may be associated with an explicit trigger for UE 115-e to update the TCI state and perform a beam management procedure. In some examples, the TCI state indication may be associated with an implicit trigger (e.g., including an uplink common TCI state, a downlink common TCI state, a joint uplink-downlink TCI state) for UE 115-e to update the TCI state and perform a beam management procedure At 410, UE 115-e may determine, based on receiving the indication to update the TCI state, that UE 115-e is to participate in a beam management procedure involving one or more beams associated with the TCI state In some examples, participating in the beam management procedure may depend on receiving the message indicating that the beam management mode is turned on.

At 415, UE 115-e may participate in the beam management procedure, through communication with base station 105-e, of one or more reference signals on the one or more beams associated with the TCI state (e.g., indicated in TCI state indicator at 405). In some examples, the beam management procedure may be associated with downlink communications, uplink communications, or both. The beam management procedure may vary depending on the type of TCI state indicated in the TCI state indicator at 405 (e.g., the type of communications associated with the TCI state).

In some examples, the updated TCI state may be a common downlink TCI state, a joint uplink-downlink TCI state, or any other TCI state associated with downlink communications. As such, base station 105-e may transmit, and UE 115-e may receive, one or more reference signals (e.g., CSI-RSs) associated with the TCI state. In some examples, UE 115-e may receive the one or more reference signals via a beam of the one or more beams associated with the TCI state. In some examples, UE 115-e may receive the one or more reference signals via a set of narrow beams (narrower than and spatially overlapping with, at least in part) a beam of the one or more beams associated with the TCI state. In other examples, UE 115-e may receive the one or more reference signals via a set of beams, including a beam of the one or more beams associated with the TCI state and one or more beams neighboring the beam associated with the TCI state. In some cases, base station 105-e may transmit, and UE 115-e may receive, a message indicating a beam configuration for receiving the one or more reference signals. In some examples, the beam configuration may include a mapping of the TCI state to one of a CSI report or a CSI trigger state. As such, UE 115-may determine a set of resources for receiving the one or more reference signals based on the mapping. Such mapping is explained in more detail with reference to FIG. 2. Base station 105-e may transmit the message as (or within) RRC signaling, DCI signaling, or MAC-CE signaling.

In some examples, UE 115-e may receive the one or more reference signals and may perform one or more measurements bases on the one or more reference signals. The measurements may be examples of RSRP measurements, SINR measurements, or a combination thereof, based on the one or more reference signals. In some cases, UE 115-e may transmit a measurement report to base station 105-e. UE 115-e may transmit a CSI report, to base station 105-e, on a set of resources based on performing the one or more measurements, where the set of resources may be configured for UE 115-e or UE 115-e receives a message indicated the set of resources for transmitting the CSI report.

UE 115-e may be configured to perform a beam refinement procedure to update the TCI state. In some examples, the beam refinement procedure may be based on the one or more measurements performed at UE 115-e.

In some examples, the updated TCI state may be a common uplink TCI state, a joint uplink-downlink TCI state, or any other TCI state associated with uplink communications. As such, UE 115-e may transmit one or more reference signals (e.g., SRSs) associated with the TCI state. In some examples, UE 115-e may transmit the one or more reference signals via a resource associated with a beam of the one or more beams associated with the TCI state. In some examples, UE 115-e may determine the resource based on a predefined rule (e.g., identifying a source reference signal) associated with the TCI state or based on a message received by UE 115-e, where the message includes an SRI associated with the TCI state. In other examples, UE 115-e may transmit the one or more reference signals via a set of resources, the set of resources associated with a set of narrow beams (each narrower than and spatially overlapping with, at least in part) a beam of the one or more beams associated with the TCI state. In yet other examples, UE 115-e may transmit the one or more reference signals via a set of resources associated with a set of beams, the set of beams including a beam of the one or more beams associated with the TCI state and one or more beams neighboring the beam associated with the TCI state.

UE 115-e may be configured to participate in the beam management procedure periodically, semi-statically, or aperiodically based on the beam management procedure configuration.

At 420, UE 115-e and base station 105-e may communicate based on performing the beam management procedure. As such, UE 115-e and/or base station 105-e may be able to manage a TCI state at UE 115-e, configuring the communications between UE 115-e and base station 105-e with current CSI, thereby improving communications reliability, increasing transmission throughput, and enhancing signal quality.

Figure 5:
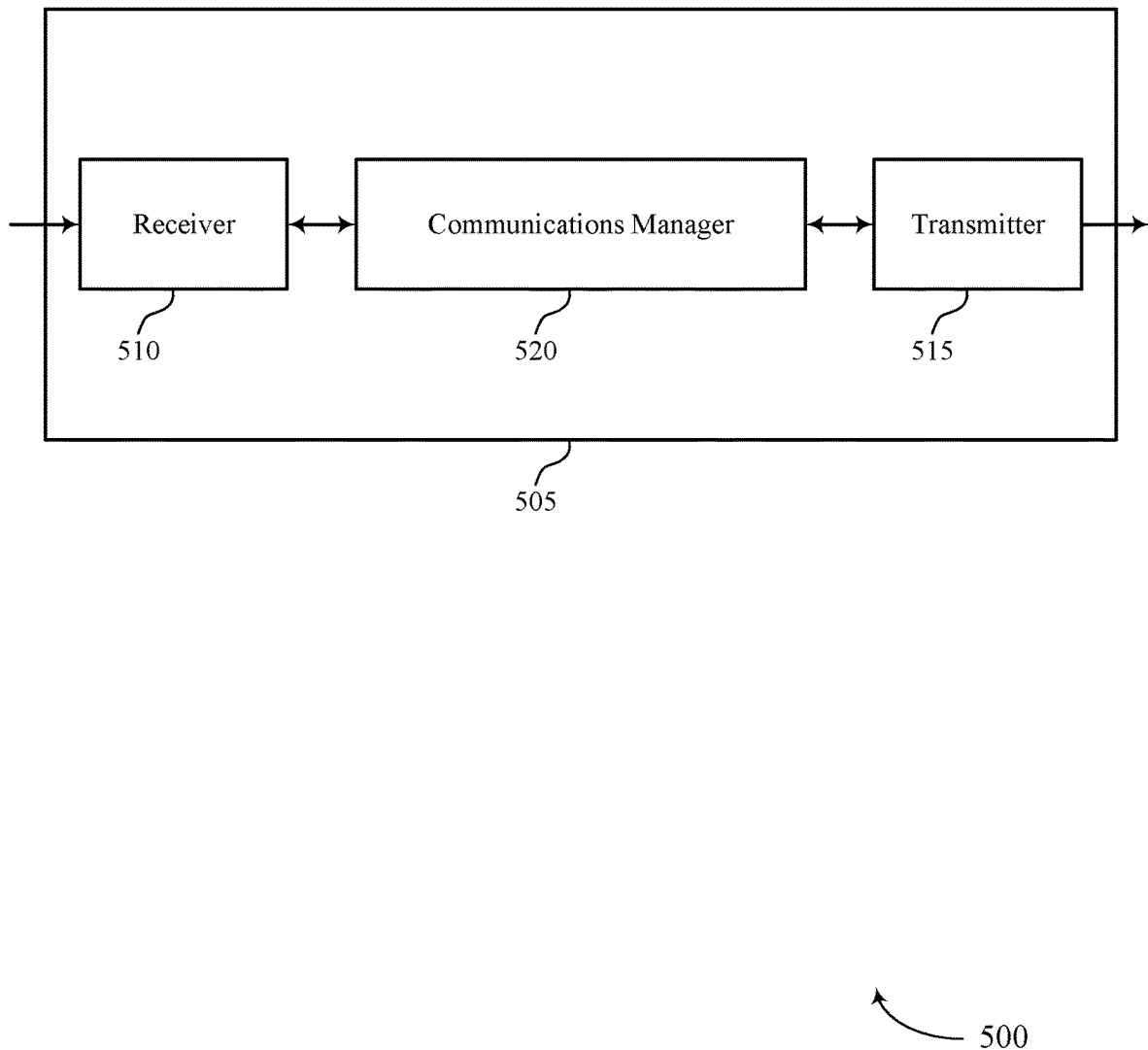
FIGS. 5 and 6 show block diagrams of devices that support techniques for managing a TCI state in accordance with aspects of the present disclosure.

FIG. 5 shows a block diagram 500 of a device 505 that supports techniques for managing a TCI state in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing a TCI state). Information may be passed on to other components of the device 505. The receiver 510 may utilize a single antenna or a set of multiple antennas.

The transmitter 515 may provide a means for transmitting signals generated by other components of the device 505.

For example, the transmitter 515 may transmit information such as packets, user data, control information, or any combination thereof associated with various information channels (e.g., control channels, data channels, information channels related to techniques for managing a TCI state). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for managing a TCI state as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at UE in accordance with examples as disclosed herein. For example, the communications manager 520 may be configured as or otherwise support a means for receiving, in a downlink control information message, an indication to update a TCI state associated with a communications channel between the UE and a base station. The communications manager 520 may be configured as or otherwise support a means for determining, based on receiving the indication to update the TCI state, that the UE is to participate in a beam management procedure involving one or more beams associated with the TCI state. The communications manager 520 may be configured as or otherwise support a means for participating in the beam management procedure through communication, with the base station, of one or more reference signals on the one or more beams associated with the TCI state.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
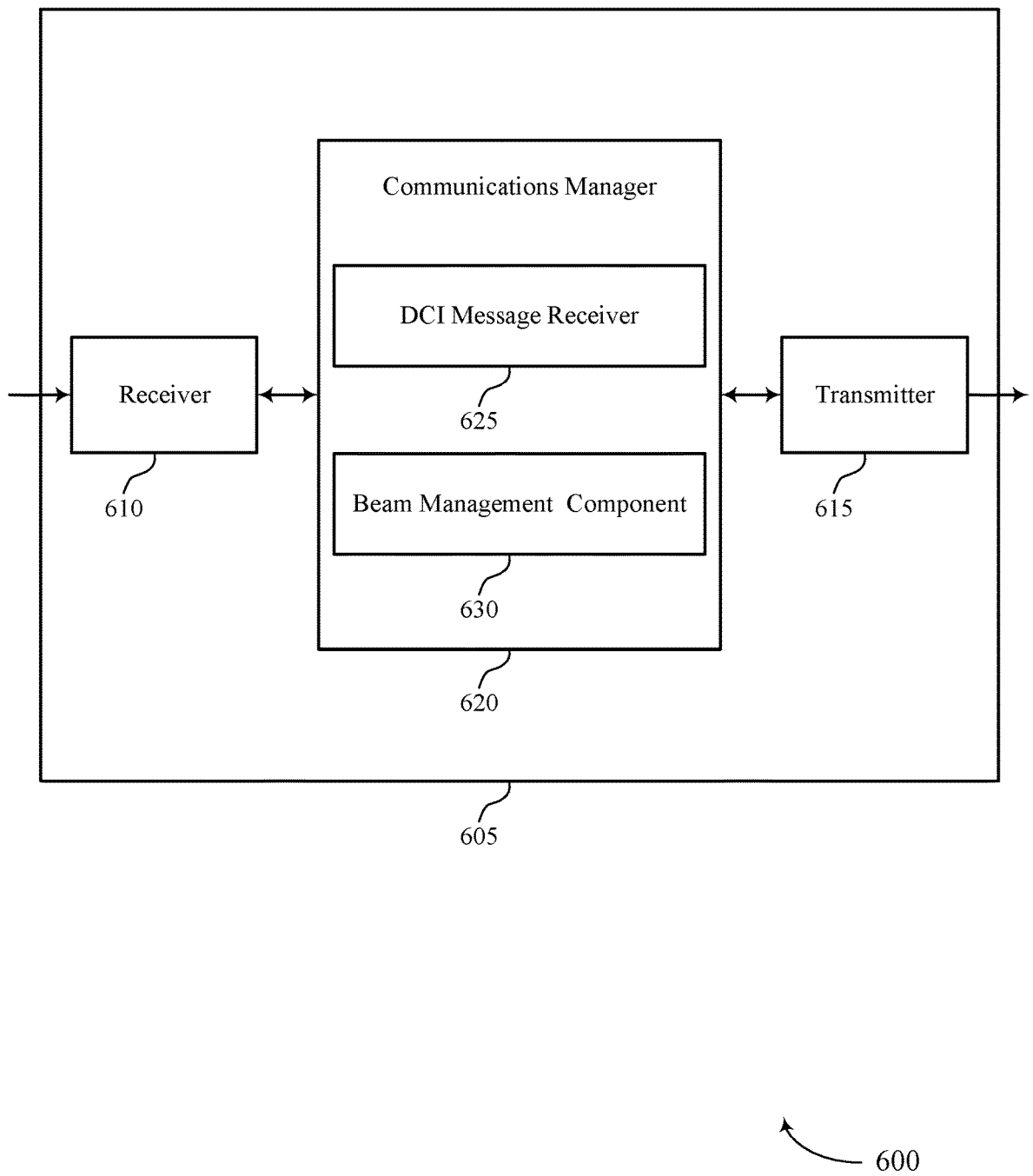

FIG. 6 shows a block diagram 600 of a device 605 that supports techniques for managing a TCI state in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing a TCI state). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for managing a TCI state). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for managing a TCI state as described herein. For example, the communications manager 620 may include a DCI message receiver 625 a beam management component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at UE in accordance with examples as disclosed herein. The DCI message receiver 625 may be configured as or otherwise support a means for receiving, in a downlink control information message, an indication to update a TCI state associated with a communications channel between the UE and a base station. The beam management component 630 may be configured as or otherwise support a means for determining, based on receiving the indication to update the TCI state, that the UE is to participate in a beam management procedure involving one or more beams associated with the TCI state. The beam management component 630 may be configured as or otherwise support a means for participating in the beam management procedure through communication, with the base station, of one or more reference signals on the one or more beams associated with the TCI state.

Figure 7:
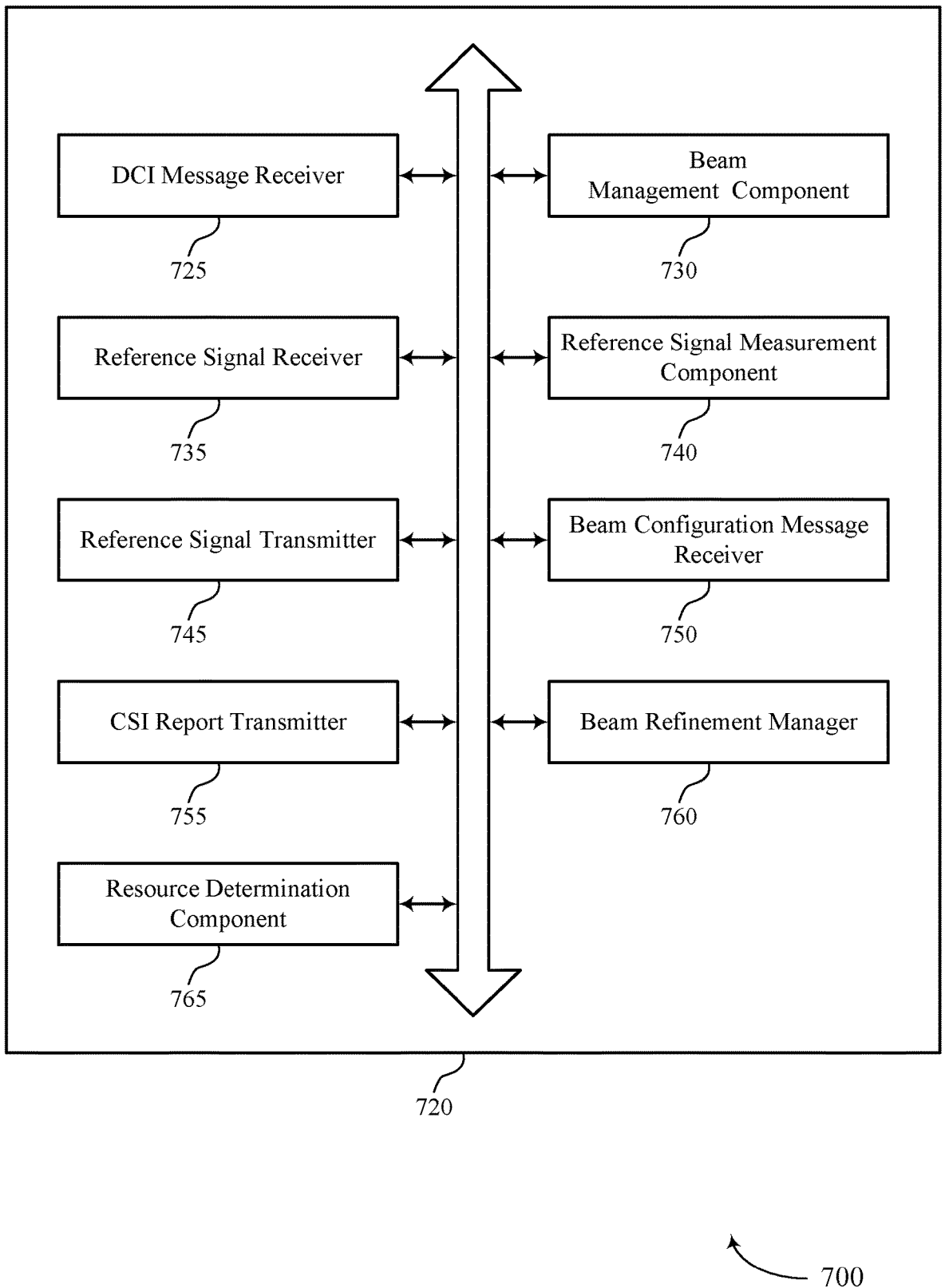
FIG. 7 shows a block diagram of a communications manager that supports techniques for managing a TCI state in accordance with aspects of the present disclosure.

FIG. 7 shows a block diagram 700 of a communications manager 720 that supports techniques for managing a TCI state in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for managing a TCI state as described herein. For example, the communications manager 720 may include a DCI message receiver 725, a beam management component 730, a reference signal receiver 735, a reference signal measurement component 740, a reference signal transmitter 745, a beam configuration message receiver 750, a beam refinement manager 760, a resource determination component 765, or any combination thereof. Each of these components may communicate, directly or indirectly, with one another (e.g., via one or more buses).

The communications manager 720 may support wireless communications at UE in accordance with examples as disclosed herein. The DCI message receiver 725 may be configured as or otherwise support a means for receiving, in a downlink control information message, an indication to update a TCI state associated with a communications channel between the UE and a base station. The beam management component 730 may be configured as or otherwise support a means for determining, based on receiving the indication to update the TCI state, that the UE is to participate in a beam management procedure involving one or more beams associated with the TCI state. In some examples, the beam management component 730 may be configured as or otherwise support a means for participating in the beam management procedure through communication, with the base station, of one or more reference signals on the one or more beams associated with the TCI state.

In some examples, to support participating in the beam management procedure, the reference signal receiver 735 may be configured as or otherwise support a means for receiving the one or more reference signals associated with the TCI state, the one or more reference signals being CSI-RSs. In some examples, to support participating in the beam management procedure, the reference signal measurement component 740 may be configured as or otherwise support a means for performing one or more measurements based on the one more reference signals.

In some examples, to support receiving the one or more reference signals, the reference signal receiver 735 may be configured as or otherwise support a means for receiving the one or more reference signals via a beam of the one or more beams associated with the TCI state.

In some examples, to support receiving the one or more reference signals, the reference signal receiver 735 may be configured as or otherwise support a means for receiving the one or more reference signals via a set of multiple narrow beams that are each narrower than and spatially overlapping with, at least in part, a beam of the one or more beams associated with the TCI state.

In some examples, to support receiving the one or more reference signals, the reference signal receiver 735 may be configured as or otherwise support a means for receiving the one or more reference signals via a set of multiple beams, the set of multiple beams including a beam of the one or more beams associated with the TCI state and one or more beams neighboring the beam.

In some examples, the beam configuration message receiver 750 may be configured as or otherwise support a means for receiving a message indicating a beam configuration for receiving the one or more reference signals, the message received via radio resource control signaling, downlink control information signaling, or medium access control element signaling.

In some examples, the beam configuration includes a mapping of the TCI state to one of a CSI report configuration or an aperiodic CSI trigger state, and the resource determination component 765 may be configured as or otherwise support a means for determining a set of resources for receiving the one or more reference signals based on the mapping.

In some examples, the 755 may be configured as or otherwise support a means for transmitting a CSI report on a set of resources based on performing the one or more measurements, where the set of resources are preconfigured or the UE receives a message indicating the set of resources for transmitting the CSI report.

In some examples, to support participating in the beam management procedure, the beam refinement manager 760 may be configured as or otherwise support a means for performing a beam refinement procedure to update the TCI state based on the one or more measurements.

In some examples, to support performing the one or more measurements, the reference signal measurement component 740 may be configured as or otherwise support a means for determining a reference signal received power, signal-to-noise-plus-interference ratio, or a combination thereof based on the one or more reference signals.

In some examples, to support participating in the beam management procedure, the reference signal transmitter 745 may be configured as or otherwise support a means for transmitting the one or more reference signals associated with the TCI state, the one or more reference signals being SRSs.

In some examples, to support transmitting the one or more reference signals, the reference signal receiver 735 may be configured as or otherwise support a means for transmitting the one or more reference signals via a resource associated with a beam of the one or more beams associated with the TCI state.

In some examples, the resource determination component 765 may be configured as or otherwise support a means for determining the resource based on a predefined rule associated with the TCI state or based on a message received by the UE, the message including a SRS resource indicator associated with the TCI state.

In some examples, to support transmitting the one or more reference signals, the reference signal transmitter 745 may be configured as or otherwise support a means for transmitting the one or more reference signals via a set of resources, the set of resources associated with a set of multiple narrow beams that are each narrower than and spatially overlapping with, at least in part, a beam of the one or more beams associated with the TCI state.

In some examples, to support transmitting the one or more reference signals, the reference signal transmitter 745 may be configured as or otherwise support a means for transmitting the one or more reference signals via a set of resources associated with a set of multiple beams, the set of multiple beams including a beam of the one or more beams associated with the TCI state and one or more beams neighboring the beam.

In some examples, the beam configuration message receiver 750 may be configured as or otherwise support a means for receiving a message indicating that a beam management mode is tuned on, where determining that the UE is to participate in the beam management procedure is based on the beam management mode being on, where the message is received via radio resource control signaling, downlink control information signaling, or medium access control element signaling.

In some examples, to support participating in the beam management procedure, the beam management component 730 may be configured as or otherwise support a means for participating in the beam management procedure periodically, semi-statically, or aperiodically based on a beam management procedure configuration.

In some examples, the TCI state indicates a common beam for one or more uplink signal types, one or more downlink signal types, or a combination thereof.

Figure 8:
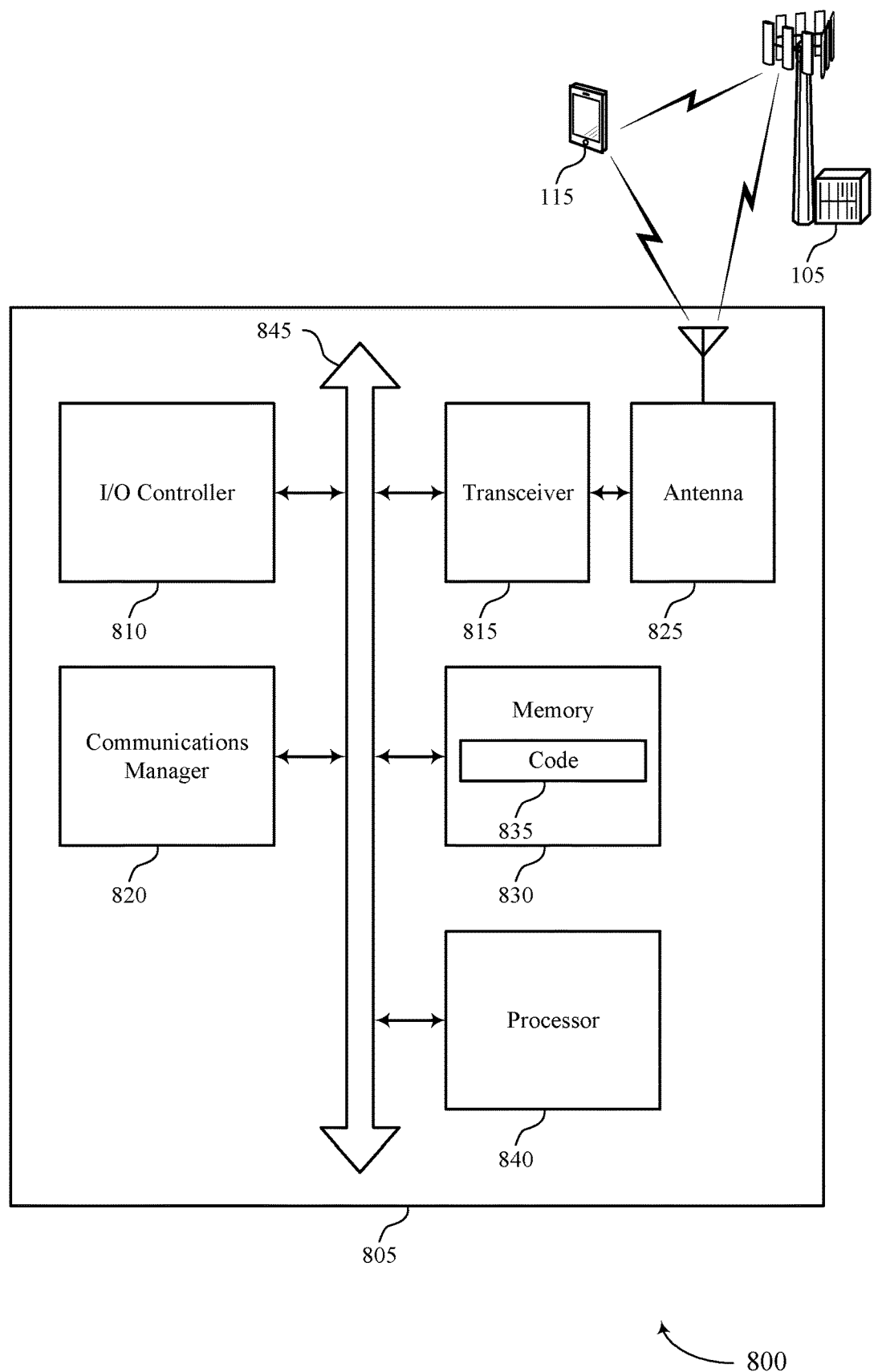
FIG. 8 shows a diagram of a system including a device that supports techniques for managing a TCI state in accordance with aspects of the present disclosure.

FIG. 8 shows a diagram of a system 800 including a device 805 that supports techniques for managing a TCI state in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing a TCI state). For example, the device 805 or a component of the device 805 may include a processor 840 and memory 830 coupled to the processor 840, the processor 840 and memory 830 configured to perform various functions described herein.

The communications manager 820 may support wireless communications at UE in accordance with examples as disclosed herein. For example, the communications manager 820 may be configured as or otherwise support a means for receiving, in a downlink control information message, an indication to update a TCI state associated with a communications channel between the UE and a base station. The communications manager 820 may be configured as or otherwise support a means for determining, based on receiving the indication to update the TCI state, that the UE is to participate in a beam management procedure involving one or more beams associated with the TCI state. The communications manager 820 may be configured as or otherwise support a means for participating in the beam management procedure through communication, with the base station, of one or more reference signals on the one or more beams associated with the TCI state.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing a TCI state as described herein, or the processor 840 and the memory 830 may be otherwise configured to perform or support such operations.

Figure 9:
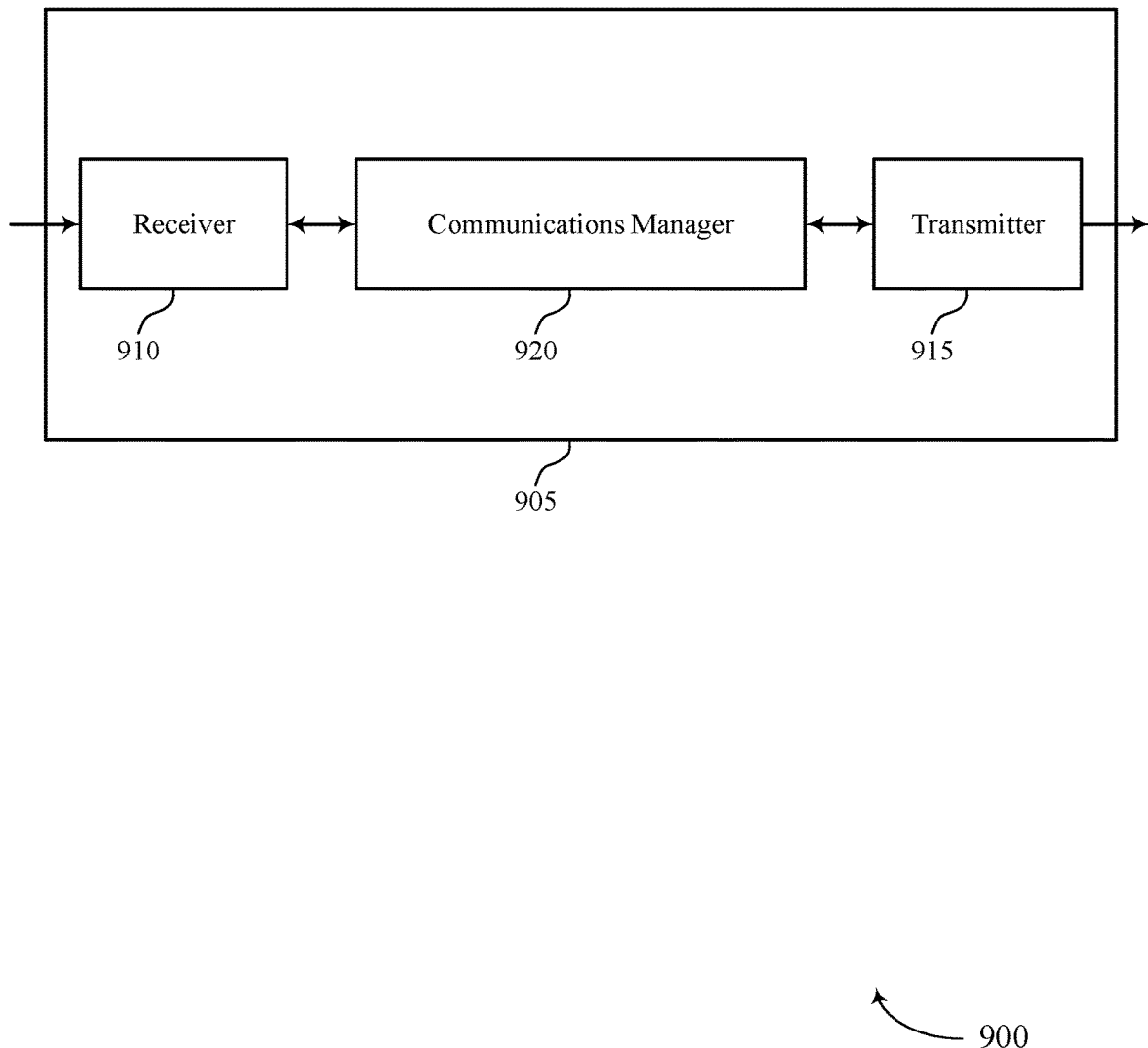
FIGS. 9 and 10 show block diagrams of devices that support techniques for managing a TCI state in accordance with aspects of the present disclosure.

FIG. 9 shows a block diagram 900 of a device 905 that supports techniques for managing a TCI state in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing a TCI state). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing a TCI state). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for managing a TCI state as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, in a downlink control information message, an indication to update a TCI state associated with a communications channel between the UE and the base station. The communications manager 920 may be configured as or otherwise support a means for determining to participate in a beam management procedure involving one or more beams associated with the TCI state. The communications manager 920 may be configured as or otherwise support a means for participating in the beam management procedure through communication, with the UE, of one or more reference signals on the one or more beams associated with the TCI state.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources.

Figure 10:
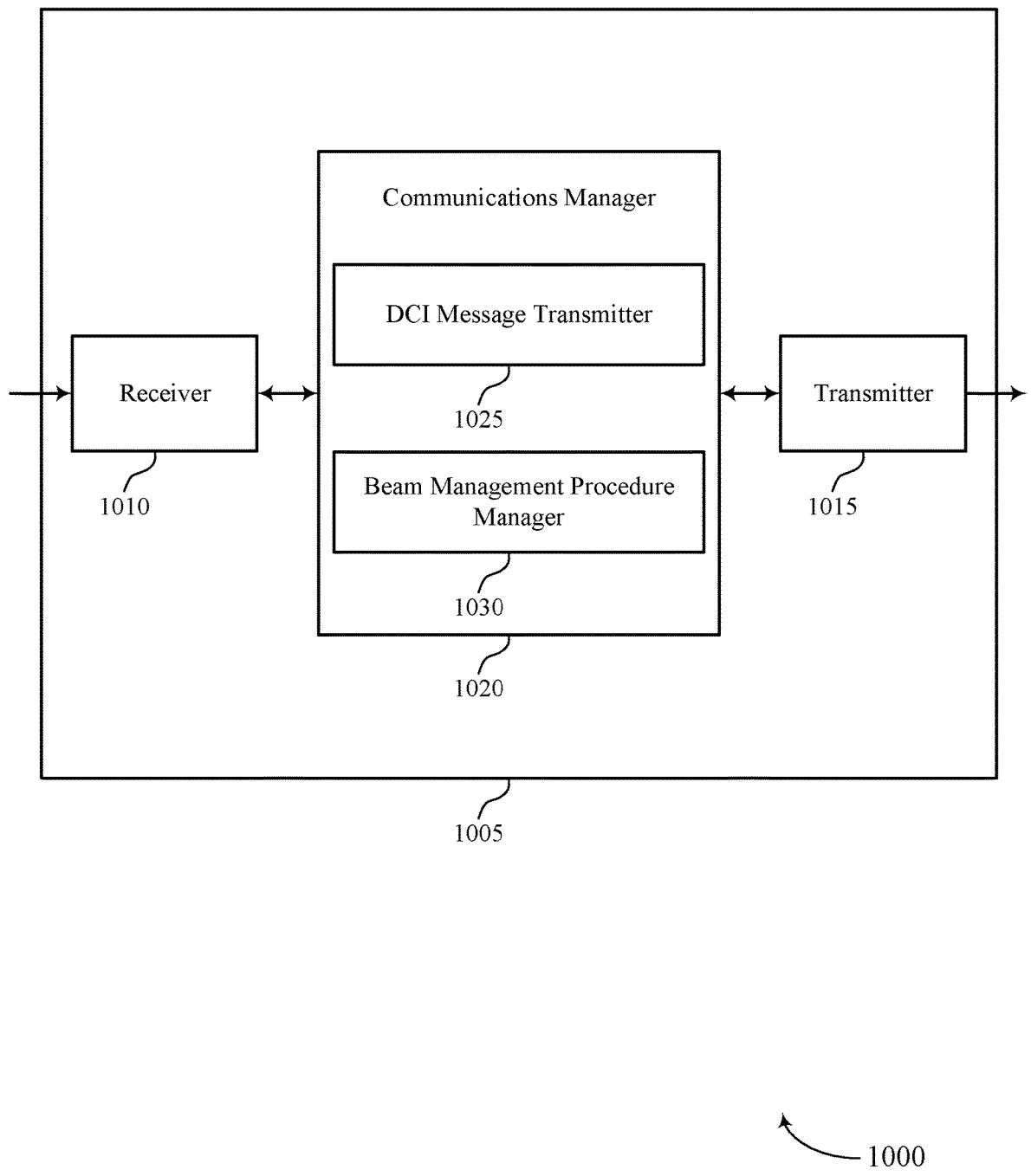

FIG. 10 shows a block diagram 1000 of a device 1005 that supports techniques for managing a TCI state in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing a TCI state). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing a TCI state). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for managing a TCI state as described herein. For example, the communications manager 1020 may include a DCI message transmitter 1025 a beam management procedure manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The DCI message transmitter 1025 may be configured as or otherwise support a means for transmitting, to a UE, in a downlink control information message, an indication to update a TCI state associated with a communications channel between the UE and the base station. The beam management procedure manager 1030 may be configured as or otherwise support a means for determining to participate in a beam management procedure involving one or more beams associated with the TCI state. The beam management procedure manager 1030 may be configured as or otherwise support a means for participating in the beam management procedure through communication, with the UE, of one or more reference signals on the one or more beams associated with the TCI state.

Figure 11:
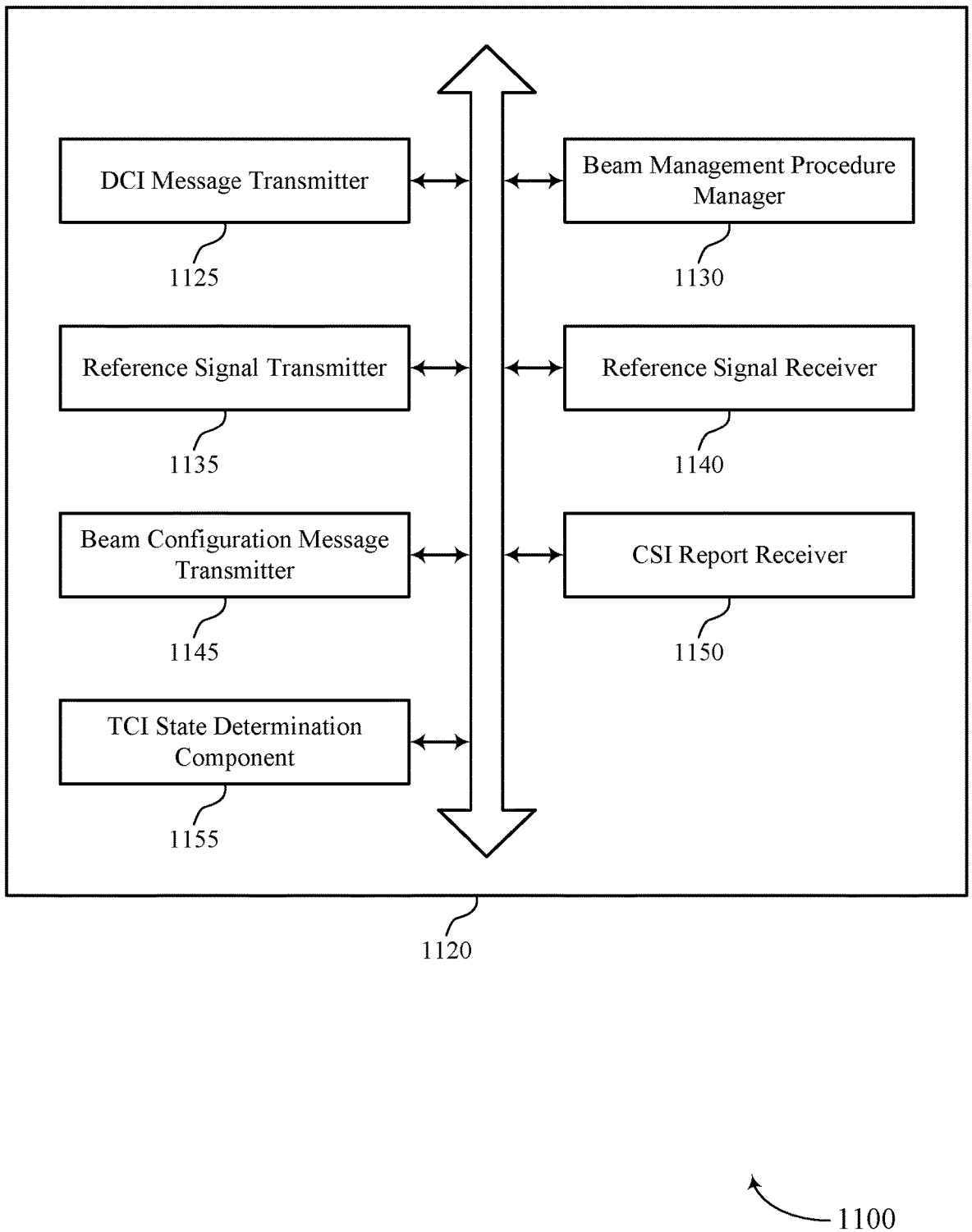
FIG. 11 shows a block diagram of a communications manager that supports techniques for managing a TCI state in accordance with aspects of the present disclosure.

FIG. 11 shows a block diagram 1100 of a communications manager 1120 that supports techniques for managing a TCI state in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing a TCI state as described herein. For example, the communications manager 1120 may include a DCI message transmitter 1125, a beam management procedure manager 1130, a reference signal transmitter 1135, a reference signal receiver 1140, a beam configuration message transmitter 1145, a CSI report receiver 1150, a TCI state determination component 1155, or any combination thereof. Each of these components may communicate, directly or indirectly, with one another (e.g., via one or more buses).

The communications manager 1120 may support wireless communications at a base station in accordance with examples as disclosed herein. The DCI message transmitter 1125 may be configured as or otherwise support a means for transmitting, to a UE, in a downlink control information message, an indication to update a TCI state associated with a communications channel between the UE and the base station. The beam management procedure manager 1130 may be configured as or otherwise support a means for determining to participate in a beam management procedure involving one or more beams associated with the TCI state. In some examples, the beam management procedure manager 1130 may be configured as or otherwise support a means for participating in the beam management procedure through communication, with the UE, of one or more reference signals on the one or more beams associated with the TCI state.

In some examples, to support participating in the beam management procedure, the reference signal transmitter 1135 may be configured as or otherwise support a means for transmitting the one or more reference signals associated with the TCI state, the one or more reference signals being CSI-RSs.

In some examples, to support transmitting the one or more reference signals, the reference signal transmitter 1135 may be configured as or otherwise support a means for transmitting the one or more reference signals via a beam of the one or more beams associated with the TCI state.

In some examples, to support transmitting the one or more reference signals, the reference signal transmitter 1135 may be configured as or otherwise support a means for transmitting the one or more reference signals via a set of multiple narrow beams that are each narrower than and spatially overlapping with, at least in part, a beam of the one or more beams associated with the TCI state.

In some examples, to support transmitting the one or more reference signals, the reference signal transmitter 1135 may be configured as or otherwise support a means for transmitting the one or more reference signals via a set of multiple beams, the set of multiple beams including a beam of the one or more beams associated with the TCI state and one or more beams neighboring the beam.

In some examples, the beam configuration message transmitter 1145 may be configured as or otherwise support a means for transmitting a message indicating a beam configuration for receiving the one or more reference signals, the message transmitted via radio resource control signaling, downlink control information signaling, or medium access control element signaling.

In some examples, the beam configuration includes a mapping of the TCI state to one of a CSI report configuration or a CSI trigger state, a set of resources for transmitting the one or more reference signals based on the mapping.

In some examples, the CSI report receiver 1150 may be configured as or otherwise support a means for receiving a CSI report on a set of resources, the CSI report including a reference signal received power, a signal-to-noise-plus-interference ratio, or a combination thereof based on the one or more reference signals. In some examples, the TCI state determination component 1155 may be configured as or otherwise support a means for determining whether to update the TCI state based on the CSI report.

In some examples, to support participating in the beam management procedure, the reference signal receiver 1140 may be configured as or otherwise support a means for receiving the one or more reference signals associated with the TCI state, the one or more reference signals being SRSs.

In some examples, to support receiving the one or more reference signals, the reference signal receiver 1140 may be configured as or otherwise support a means for receiving the one or more reference signals via a resource associated with a beam of the one or more beams associated with the TCI state.

In some examples, the resource is based on a predefined rule associated with the TCI state or based on a message transmitted to the UE, the message including a SRS resource indicator associated with the TCI state.

In some examples, to support receiving the one or more reference signals, the reference signal receiver 1140 may be configured as or otherwise support a means for receiving the one or more reference signals via a set of resources, the set of resources associated with a set of multiple narrow beams that are each narrower than and spatially overlapping with, at least in part, a beam of the one or more beams associated with the TCI state.

In some examples, to support receiving the one or more reference signals, the reference signal receiver 1140 may be configured as or otherwise support a means for receiving the one or more reference signals via a set of resources associated with a set of multiple beams, the set of multiple beams including a beam of the one or more beams associated with the TCI state and one or more beams neighboring the beam.

In some examples, the beam management procedure manager 1130 may be configured as or otherwise support a means for determining to turn on a beam management mode, where determining that the base station is to participate in the beam management procedure is based on the beam management mode being on. In some examples, the beam configuration message transmitter 1145 may be configured as or otherwise support a means for transmitting a message indicating that the beam management mode is tuned on, where the message is transmitted via radio resource control signaling, downlink control information signaling, or medium access control element signaling.

Figure 12:
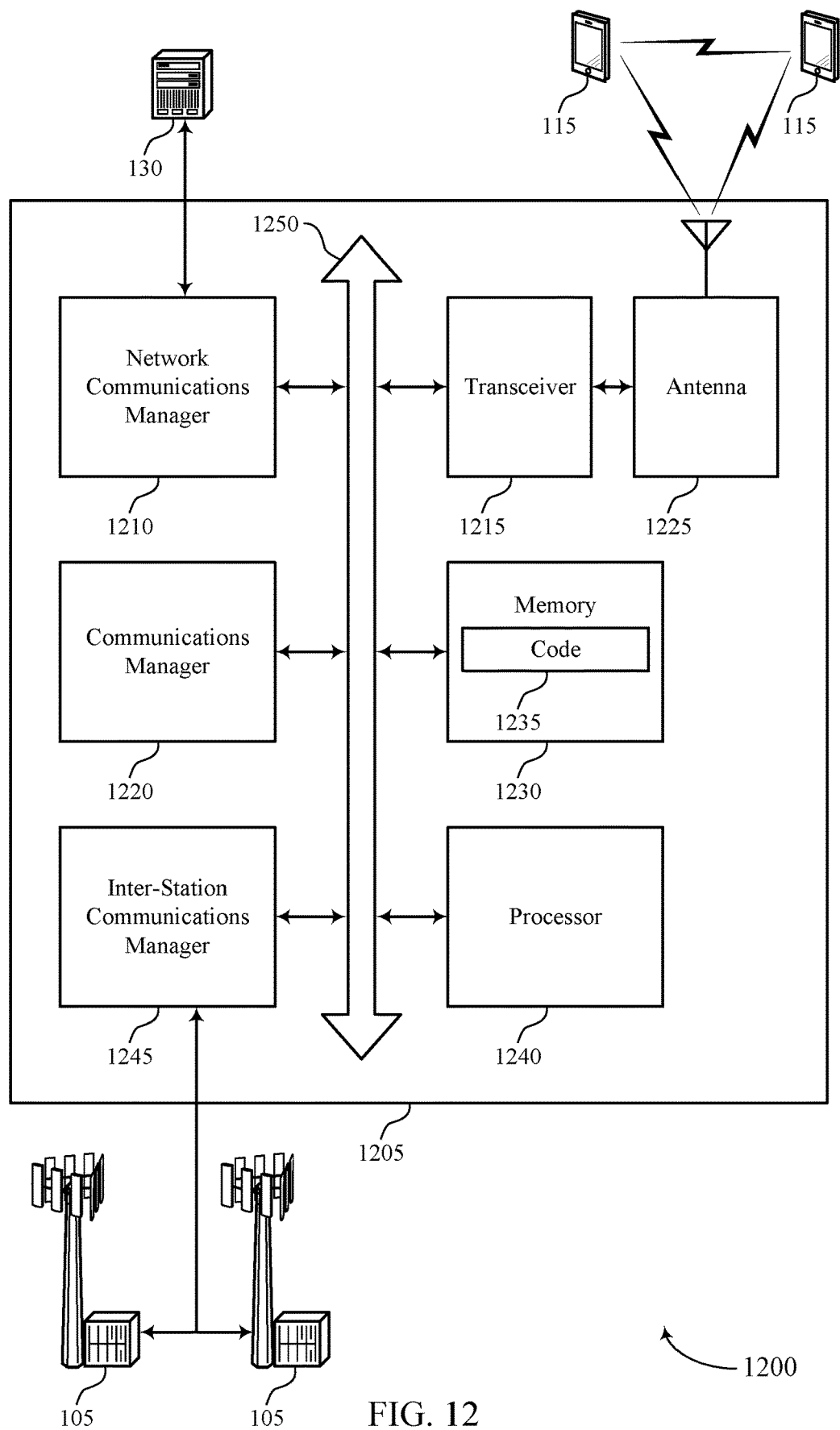
FIG. 12 shows a diagram of a system including a device that supports techniques for managing a TCI state in accordance with aspects of the present disclosure.

FIG. 12 shows a diagram of a system 1200 including a device 1205 that supports techniques for managing a TCI state in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing a TCI state). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, in a downlink control information message, an indication to update a TCI state associated with a communications channel between the UE and the base station. The communications manager 1220 may be configured as or otherwise support a means for determining to participate in a beam management procedure involving one or more beams associated with the TCI state. The communications manager 1220 may be configured as or otherwise support a means for participating in the beam management procedure through communication, with the UE, of one or more reference signals on the one or more beams associated with the TCI state.

By including or configuring the communications manager 1220 in accordance with examples as described herein, the device 1205 may support techniques for improved communication reliability, reduced latency, more efficient utilization of communication resources, and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing a TCI state as described herein, or the processor 1240 and the memory 1230 may be otherwise configured to perform or support such operations.

Figure 13:
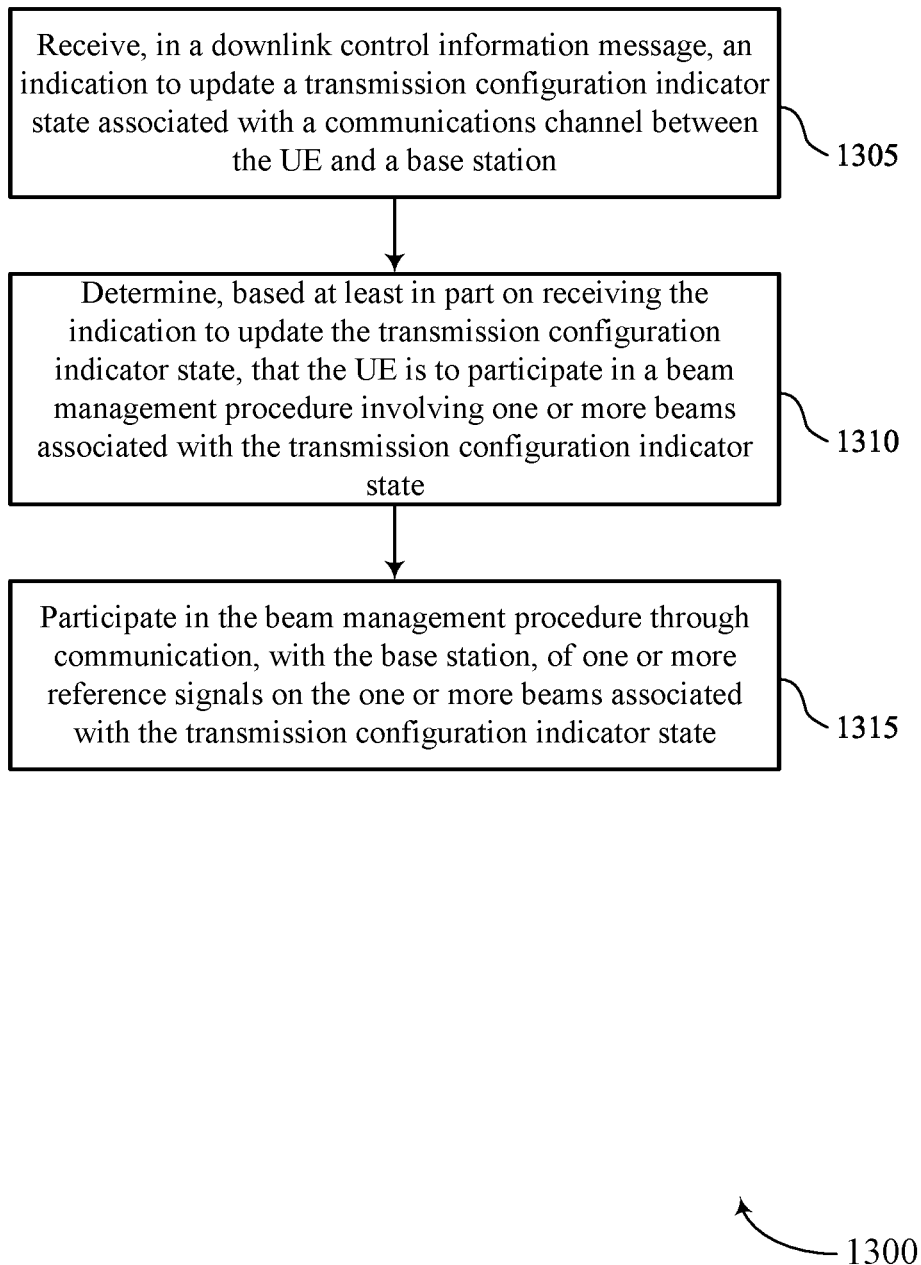
FIGS. 13 through 16 show flowcharts illustrating methods that support techniques for managing a TCI state in accordance with aspects of the present disclosure.

FIG. 13 shows a flowchart illustrating a method 1300 that supports techniques for managing a TCI state in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, in a downlink control information message, an indication to update a TCI state associated with a communications channel between the UE and a base station. The operations of 1305 may be performed in accordance with examples as disclosed herein. In some examples, aspects of the operations of 1305 may be performed by a DCI message receiver 725 as described with reference to FIG. 7.

At 1310, the method may include determining, based on receiving the indication to update the TCI state, that the UE is to participate in a beam management procedure involving one or more beams associated with the TCI state. The operations of 1310 may be performed in accordance with examples as disclosed herein. In some examples, aspects of the operations of 1310 may be performed by a beam management component 730 as described with reference to FIG. 7.

At 1315, the method may include participating in the beam management procedure through communication, with the base station, of one or more reference signals on the one or more beams associated with the TCI state. The operations of 1315 may be performed in accordance with examples as disclosed herein. In some examples, aspects of the operations of 1315 may be performed by a beam management component 730 as described with reference to FIG. 7.

Figure 14:
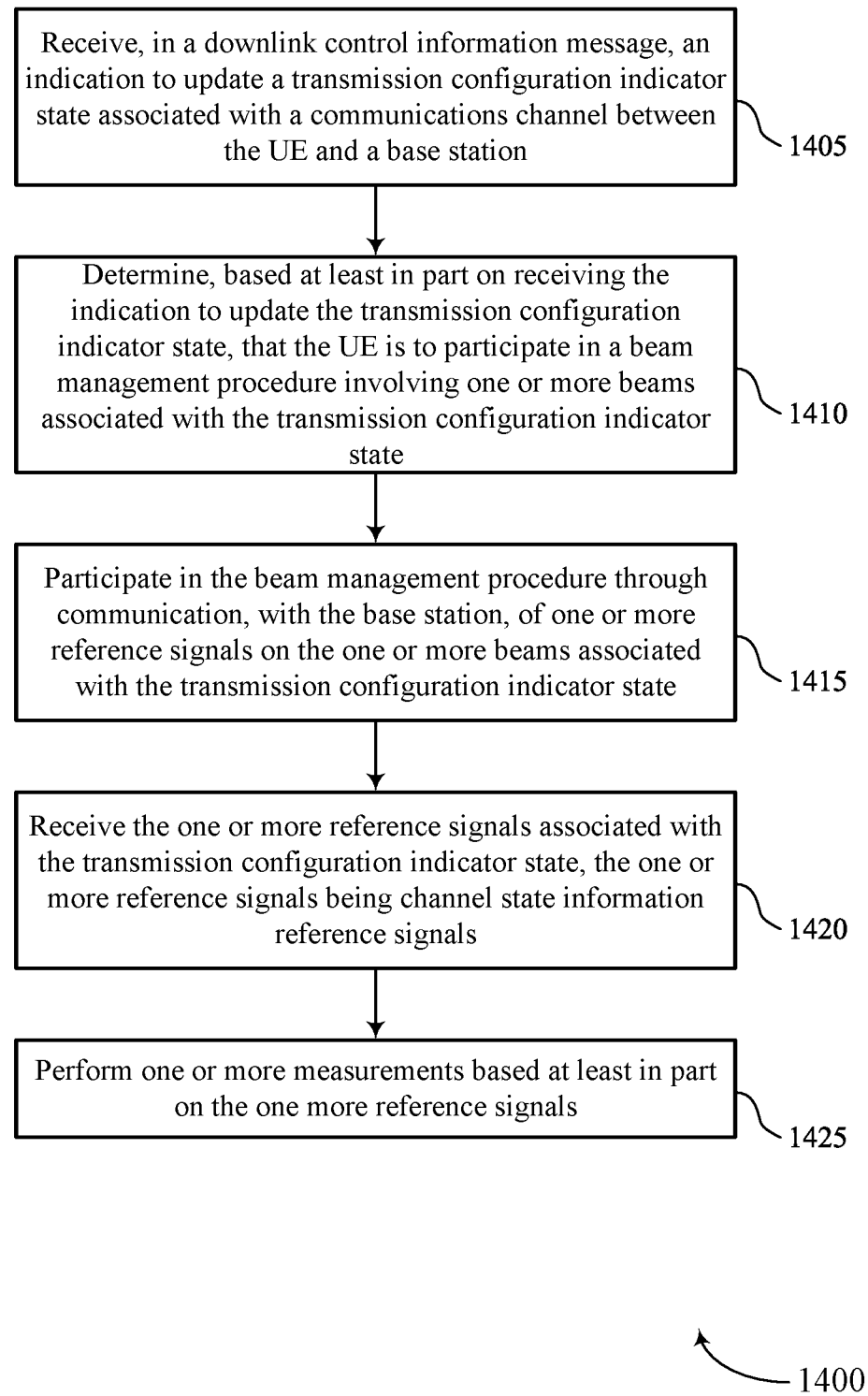

FIG. 14 shows a flowchart illustrating a method 1400 that supports techniques for managing a TCI state in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, in a downlink control information message, an indication to update a TCI state associated with a communications channel between the UE and a base station. The operations of 1405 may be performed in accordance with examples as disclosed herein. In some examples, aspects of the operations of 1405 may be performed by a DCI message receiver 725 as described with reference to FIG. 7.

At 1410, the method may include determining, based on receiving the indication to update the TCI state, that the UE is to participate in a beam management procedure involving one or more beams associated with the TCI state. The operations of 1410 may be performed in accordance with examples as disclosed herein. In some examples, aspects of the operations of 1410 may be performed by a beam management component 730 as described with reference to FIG. 7.

At 1415, the method may include participating in the beam management procedure through communication, with the base station, of one or more reference signals on the one or more beams associated with the TCI state. The operations of 1415 may be performed in accordance with examples as disclosed herein. In some examples, aspects of the operations of 1415 may be performed by a beam management component 730 as described with reference to FIG. 7.

At 1420, the method may include receiving the one or more reference signals associated with the TCI state, the one or more reference signals being CSI-RSs. The operations of 1420 may be performed in accordance with examples as disclosed herein. In some examples, aspects of the operations of 1420 may be performed by a reference signal receiver 735 as described with reference to FIG. 7.

At 1425, the method may include performing one or more measurements based on the one more reference signals. The operations of 1425 may be performed in accordance with examples as disclosed herein. In some examples, aspects of the operations of 1425 may be performed by a reference signal measurement component 740 as described with reference to FIG. 7.

Figure 15:
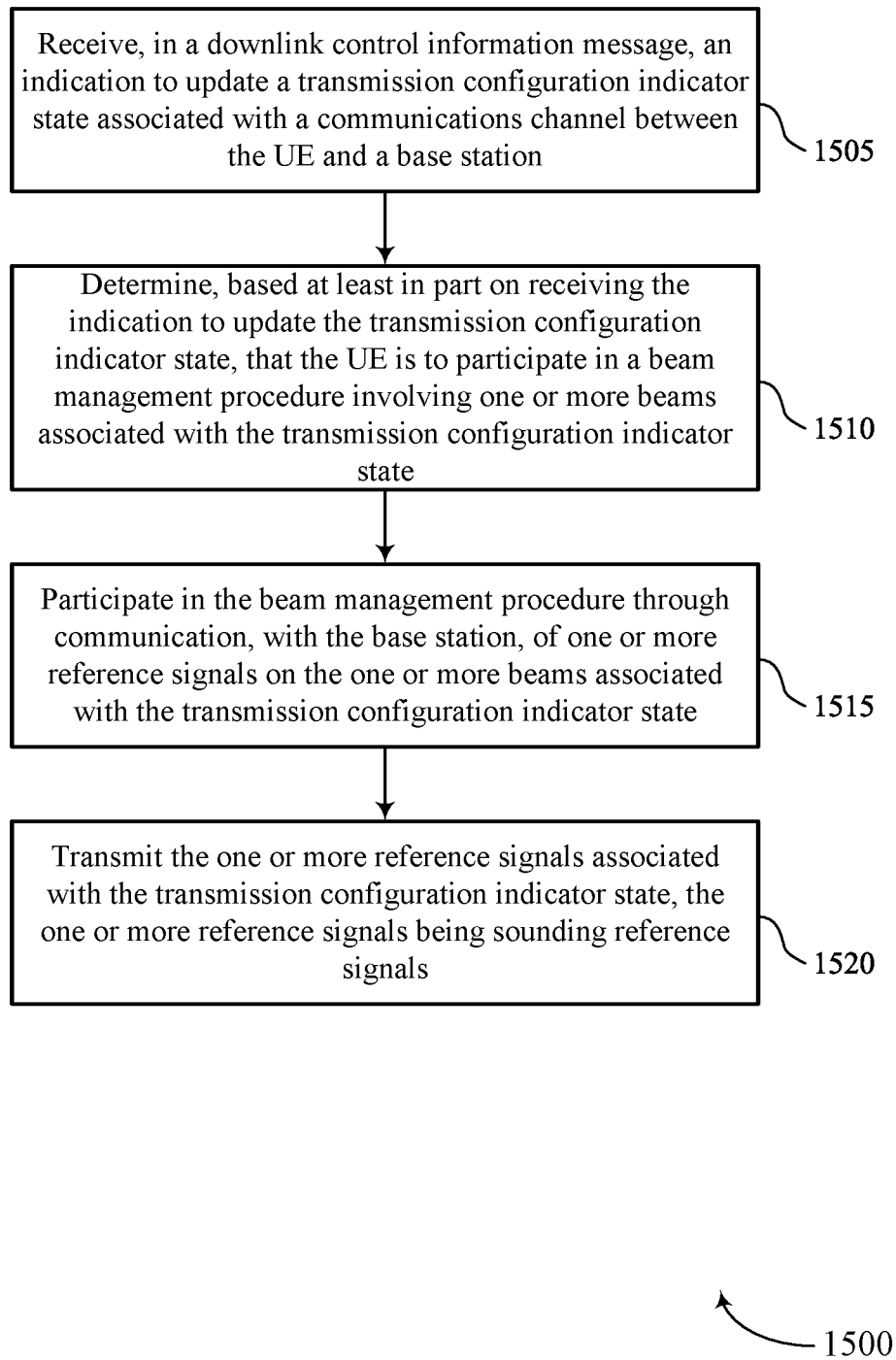

FIG. 15 shows a flowchart illustrating a method 1500 that supports techniques for managing a TCI state in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, in a downlink control information message, an indication to update a TCI state associated with a communications channel between the UE and a base station. The operations of 1505 may be performed in accordance with examples as disclosed herein. In some examples, aspects of the operations of 1505 may be performed by a DCI message receiver 725 as described with reference to FIG. 7.

At 1510, the method may include determining, based on receiving the indication to update the TCI state, that the UE is to participate in a beam management procedure involving one or more beams associated with the TCI state. The operations of 1510 may be performed in accordance with examples as disclosed herein. In some examples, aspects of the operations of 1510 may be performed by a beam management component 730 as described with reference to FIG. 7.

At 1515, the method may include participating in the beam management procedure through communication, with the base station, of one or more reference signals on the one or more beams associated with the TCI state. The operations of 1515 may be performed in accordance with examples as disclosed herein. In some examples, aspects of the operations of 1515 may be performed by a beam management component 730 as described with reference to FIG. 7.

At 1520, the method may include transmitting the one or more reference signals associated with the TCI state, the one or more reference signals being SRSs. The operations of 1520 may be performed in accordance with examples as disclosed herein. In some examples, aspects of the operations of 1520 may be performed by a reference signal transmitter 745 as described with reference to FIG. 7.

Figure 16:
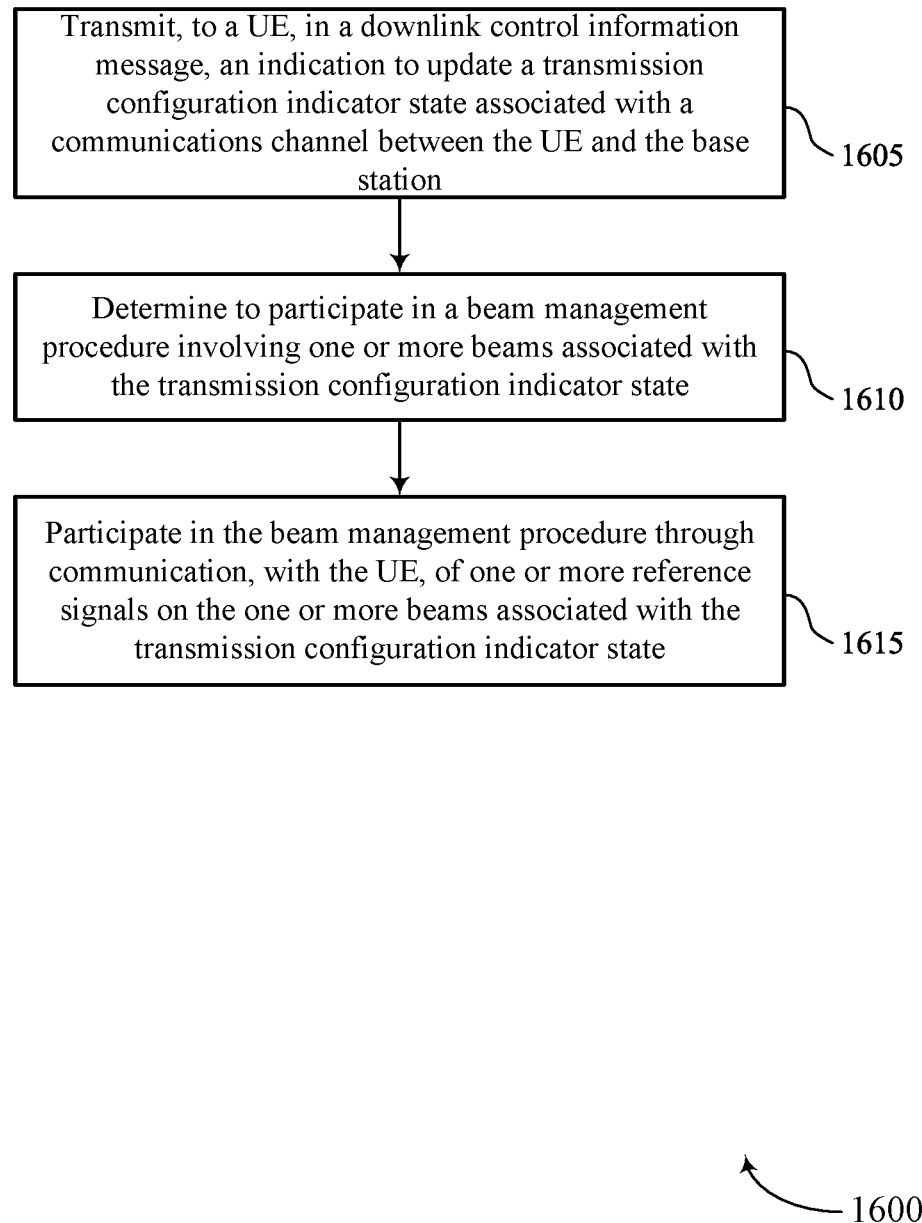

FIG. 16 shows a flowchart illustrating a method 1600 that supports techniques for managing a TCI state in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, in a downlink control information message, an indication to update a TCI state associated with a communications channel between the UE and the base station. The operations of 1605 may be performed in accordance with examples as disclosed herein. In some examples, aspects of the operations of 1605 may be performed by a DCI message transmitter 1125 as described with reference to FIG. 11.

At 1610, the method may include determining to participate in a beam management procedure involving one or more beams associated with the TCI state. The operations of 1610 may be performed in accordance with examples as disclosed herein. In some examples, aspects of the operations of 1610 may be performed by a beam management procedure manager 1130 as described with reference to FIG. 11.

At 1615, the method may include participating in the beam management procedure through communication, with the UE, of one or more reference signals on the one or more beams associated with the TCI state. The operations of 1615 may be performed in accordance with examples as disclosed herein. In some examples, aspects of the operations of 1615 may be performed by a beam management procedure manager 1130 as described with reference to FIG. 11.

The following provides an overview of aspects of the present disclosure:

Aspect 1: A method for wireless communications at UE, comprising: receiving, in a downlink control information message, an indication to update a transmission configuration indicator state associated with a communications channel between the UE and a base station; determining, based at least in part on receiving the indication to update the transmission configuration indicator state, that the UE is to participate in a beam management procedure involving one or more beams associated with the transmission configuration indicator state; and participating in the beam management procedure through communication, with the base station, of one or more reference signals on the one or more beams associated with the transmission configuration indicator state.

Aspect 2: The method of aspect 1, wherein participating in the beam management procedure further comprises: receiving the one or more reference signals associated with the transmission configuration indicator state, the one or more reference signals being channel state information reference signals; and performing one or more measurements based at least in part on the one more reference signals.

Aspect 3: The method of aspect 2, wherein receiving the one or more reference signals further comprises: receiving the one or more reference signals via a beam of the one or more beams associated with the transmission configuration indicator state.

Aspect 4: The method of any of aspects 2 through 3, wherein receiving the one or more reference signals further comprises: receiving the one or more reference signals via a plurality of narrow beams that are each narrower than and spatially overlapping with, at least in part, a beam of the one or more beams associated with the transmission configuration indicator state.

Aspect 5: The method of any of aspects 2 through 4, wherein receiving the one or more reference signals further comprises: receiving the one or more reference signals via a plurality of beams, the plurality of beams comprising a beam of the one or more beams associated with the transmission configuration indicator state and one or more beams neighboring the beam.

Aspect 6: The method of any of aspects 2 through 5, further comprising: receiving a message indicating a beam configuration for receiving the one or more reference signals, the message received via radio resource control signaling, downlink control information signaling, or medium access control element signaling.

Aspect 7: The method of aspect 6, wherein the beam configuration comprises a mapping of the transmission configuration indicator state to one of a channel state information report configuration or a channel state information trigger state, the method further comprising: determining a set of resources for receiving the one or more reference signals based at least in part on the mapping.

Aspect 8: The method of any of aspects 2 through 7, further comprising: transmitting a channel state information report on a set of resources based at least in part on performing the one or more measurements, wherein the set of resources are preconfigured or the UE receives a message indicating the set of resources for transmitting the channel state information report.

Aspect 9: The method of any of aspects 2 through 8, wherein participating in the beam management procedure further comprises: performing a beam refinement procedure to update the transmission configuration indicator state based at least in part on the one or more measurements.

Aspect 10: The method of any of aspects 2 through 9, wherein performing the one or more measurements further comprises: determining a reference signal received power, signal-to-noise-plus-interference ratio, or a combination thereof based at least in part on the one or more reference signals.

Aspect 11: The method of any of aspects 1 through 10, wherein participating in the beam management procedure further comprises: transmitting the one or more reference signals associated with the transmission configuration indicator state, the one or more reference signals being sounding reference signals.

Aspect 12: The method of aspect 11, wherein transmitting the one or more reference signals further comprises: transmitting the one or more reference signals via a resource associated with a beam of the one or more beams associated with the transmission configuration indicator state.

Aspect 13: The method of aspect 12, further comprising: determining the resource based at least in part on a predefined rule associated with the transmission configuration indicator state or based on a message received by the UE, the message comprising a sounding reference signal resource indicator associated with the transmission configuration indicator state.

Aspect 14: The method of any of aspects 11 through 13, wherein transmitting the one or more reference signals further comprises: transmitting the one or more reference signals via a set of resources, the set of resources associated with a plurality of narrow beams that are each narrower than and spatially overlapping with, at least in part, a beam of the one or more beams associated with the transmission configuration indicator state.

Aspect 15: The method of any of aspects 11 through 14, wherein transmitting the one or more reference signals further comprises: transmitting the one or more reference signals via a set of resources associated with a plurality of beams, the plurality of beams comprising a beam of the one or more beams associated with the transmission configuration indicator state and one or more beams neighboring the beam.

Aspect 16: The method of any of aspects 1 through 15, further comprising: receiving a message indicating that a beam management mode is tuned on, wherein determining that the UE is to participate in the beam management procedure is based at least in part on the beam management mode being on, wherein the message is received via radio resource control signaling, downlink control information signaling, or medium access control element signaling.

Aspect 17: The method of any of aspects 1 through 16, wherein participating in the beam management procedure further comprises: participating in the beam management procedure periodically, semi-statically, or aperiodically based at least in part on a beam management procedure configuration.

Aspect 18: The method of any of aspects 1 through 17, wherein the transmission configuration indicator state indicates a common beam for one or more uplink signal types, one or more downlink signal types, or a combination thereof.

Aspect 19: A method for wireless communications at a base station, comprising: transmitting, to a UE, in a downlink control information message, an indication to update a transmission configuration indicator state associated with a communications channel between the UE and the base station; determining to participate in a beam management procedure involving one or more beams associated with the transmission configuration indicator state; and participating in the beam management procedure through communication, with the UE, of one or more reference signals on the one or more beams associated with the transmission configuration indicator state.

Aspect 20: The method of aspect 19, wherein participating in the beam management procedure further comprises: transmitting the one or more reference signals associated with the transmission configuration indicator state, the one or more reference signals being channel state information reference signals.

Aspect 21: The method of aspect 20, wherein transmitting the one or more reference signals further comprises: transmitting the one or more reference signals via a beam of the one or more beams associated with the transmission configuration indicator state.

Aspect 22: The method of any of aspects 20 through 21, wherein transmitting the one or more reference signals further comprises: transmitting the one or more reference signals via a plurality of narrow beams that are each narrower than and spatially overlapping with, at least in part, a beam of the one or more beams associated with the transmission configuration indicator state.

Aspect 23: The method of any of aspects 20 through 22, wherein transmitting the one or more reference signals further comprises: transmitting the one or more reference signals via a plurality of beams, the plurality of beams comprising a beam of the one or more beams associated with the transmission configuration indicator state and one or more beams neighboring the beam.

Aspect 24: The method of any of aspects 20 through 23, further comprising: transmitting a message indicating a beam configuration for receiving the one or more reference signals, the message transmitted via radio resource control signaling, downlink control information signaling, or medium access control element signaling.

Aspect 25: The method of aspect 24, wherein the beam configuration comprises a mapping of the transmission configuration indicator state to one of a channel state information report configuration or a channel state information trigger state, a set of resources for transmitting the one or more reference signals based at least in part on the mapping.

Aspect 26: The method of any of aspects 20 through 25, further comprising: receiving a channel state information report on a set of resources, the channel state information report comprising a reference signal received power, a signal-to-noise-plus-interference ratio, or a combination thereof based at least in part on the one or more reference signals; and determining whether to update the transmission configuration indicator state based at least in part on the channel state information report.

Aspect 27: The method of any of aspects 19 through 26, wherein participating in the beam management procedure further comprises: receiving the one or more reference signals associated with the transmission configuration indicator state, the one or more reference signals being sounding reference signals.

Aspect 28: The method of aspect 27, wherein receiving the one or more reference signals further comprises: receiving the one or more reference signals via a resource associated with a beam of the one or more beams associated with the transmission configuration indicator state.

Aspect 29: The method of aspect 28, wherein the resource is based at least in part on a predefined rule associated with the transmission configuration indicator state or based on a message transmitted to the UE, the message comprising a sounding reference signal resource indicator associated with the transmission configuration indicator state.

Aspect 30: The method of any of aspects 27 through 29, wherein receiving the one or more reference signals further comprises: receiving the one or more reference signals via a set of resources, the set of resources associated with a plurality of narrow beams that are each narrower than and spatially overlapping with, at least in part, a beam of the one or more beams associated with the transmission configuration indicator state.

Aspect 31: The method of any of aspects 27 through 30, wherein receiving the one or more reference signals further comprises: receiving the one or more reference signals via a set of resources associated with a plurality of beams, the plurality of beams comprising a beam of the one or more beams associated with the transmission configuration indicator state and one or more beams neighboring the beam.

Aspect 32: The method of any of aspects 19 through 31, further comprising: determining to turn on a beam management mode, wherein determining that the base station is to participate in the beam management procedure is based at least in part on the beam management mode being on; transmitting a message indicating that the beam management mode is tuned on, wherein the message is transmitted via radio resource control signaling, downlink control information signaling, or medium access control element signaling.

Aspect 33: An apparatus for wireless communications at UE, comprising a processor; memory coupled with the processor; and instructions stored in the memory and executable by the processor to cause the apparatus to perform a method of any of aspects 1 through 18.

Aspect 34: An apparatus for wireless communications at UE, comprising at least one means for performing a method of any of aspects 1 through 18.

Aspect 35: A non-transitory computer-readable medium storing code for wireless communications at UE, the code comprising instructions executable by a processor to perform a method of any of aspects 1 through 18.

Aspect 36: An apparatus for wireless communications at a base station, comprising a processor; memory coupled with the processor; and instructions stored in the memory and executable by the processor to cause the apparatus to perform a method of any of aspects 19 through 32.

Aspect 37: An apparatus for wireless communications at a base station, comprising at least one means for performing a method of any of aspects 19 through 32.

Aspect 38: A non-transitory computer-readable medium storing code for wireless communications at a base station, the code comprising instructions executable by a processor to perform a method of any of aspects 19 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at user equipment (UE), comprising:
   receiving, in a downlink control information message, an indication to update a transmission configuration indicator state associated with a communications channel between the UE and a base station;
   determining, based at least in part on receiving the indication to update the transmission configuration indicator state, that the UE is to participate in a beam management procedure involving one or more beams associated with the transmission configuration indicator state, the beam management procedure associated with a beam configuration that indicates a mapping of the transmission configuration indicator state to one of a channel state information report configuration or a channel state information trigger state;
   determining a set of resources for receiving one or more reference signals based at least in part on the mapping;
   receiving a message indicating the beam configuration for receiving the one or more reference signals; and
   participating in the beam management procedure through communication, with the base station, of the one or more reference signals on the one or more beams associated with the transmission configuration indicator state;
   wherein participating in the beam management procedure further comprises:
      receiving the one or more reference signals associated with the transmission configuration indicator state, the one or more reference signals being channel state information reference signals.

2. The method of claim 1, wherein participating in the beam management procedure further comprises:
performing one or more measurements based at least in part on the one more reference signals.

3. The method of claim 2, wherein receiving the one or more reference signals further comprises:
receiving the one or more reference signals via a beam of the one or more beams associated with the transmission configuration indicator state.

4. The method of claim 2, wherein receiving the one or more reference signals further comprises:
receiving the one or more reference signals via a plurality of narrow beams that are each narrower than and spatially overlapping with, at least in part, a beam of the one or more beams associated with the transmission configuration indicator state.

5. The method of claim 2, wherein receiving the one or more reference signals further comprises:
receiving the one or more reference signals via a plurality of beams, the plurality of beams comprising a beam of the one or more beams associated with the transmission configuration indicator state and one or more beams neighboring the beam.

6. The method of claim 2, further comprising:
the message received via radio resource control signaling, downlink control information signaling, or medium access control element signaling.

7. The method of claim 2, further comprising:
transmitting a channel state information report on a set of resources based at least in part on performing the one or more measurements, wherein the set of resources are preconfigured or the UE receives a message indicating the set of resources for transmitting the channel state information report.

8. The method of claim 2, wherein participating in the beam management procedure further comprises:
performing a beam refinement procedure to update the transmission configuration indicator state based at least in part on the one or more measurements.

9. The method of claim 2, wherein performing the one or more measurements further comprises:
determining a reference signal received power, signal-to-noise-plus-interference ratio, or a combination thereof based at least in part on the one or more reference signals.

10. The method of claim 1, wherein participating in the beam management procedure further comprises:
participating in the beam management procedure periodically, semi-statically, or aperiodically based at least in part on a beam management procedure configuration.

11. The method of claim 1, wherein the transmission configuration indicator state indicates a common beam for one or more uplink signal types, one or more downlink signal types, or a combination thereof.

12. A method for wireless communications at user equipment (UE), comprising:
receiving, in a downlink control information message, an indication to update a transmission configuration indicator state associated with a communications channel between the UE and a base station;
determining, based at least in part on receiving the indication to update the transmission configuration indicator state, that the UE is to participate in a beam management procedure involving one or more beams associated with the transmission configuration indicator state; and
participating in the beam management procedure through communication, with the base station, of one or more reference signals on the one or more beams associated with the transmission configuration indicator state;
wherein participating in the beam management procedure further comprises:
transmitting the one or more reference signals associated with the transmission configuration indicator state, the one or more reference signals being sounding reference signals;
wherein transmitting the one or more reference signals further comprises:
transmitting the one or more reference signals via a resource associated with a beam of the one or more beams associated with the transmission configuration indicator state; and
determining the resource based at least in part on a predefined rule associated with the transmission configuration indicator state or based on a message received by the UE, the message comprising a sounding reference signal resource indicator associated with the transmission configuration indicator state.

13. A method for wireless communications at user equipment (UE), comprising:
receiving, in a downlink control information message, an indication to update a transmission configuration indicator state associated with a communications channel between the UE and a base station;
determining, based at least in part on receiving the indication to update the transmission configuration indicator state, that the UE is to participate in a beam management procedure involving one or more beams associated with the transmission configuration indicator state;
participating in the beam management procedure through communication, with the base station, of the one or more reference signals on the one or more beams associated with the transmission configuration indicator state; and
receiving a message indicating that a beam management mode is tuned on, wherein determining that the UE is to participate in the beam management procedure is based at least in part on the beam management mode being on, wherein the message is received via radio resource control signaling, downlink control information signaling, or medium access control element signaling.

14. A method for wireless communications at a base station, comprising:
transmitting, to a user equipment (UE), in a downlink control information message, an indication to update a transmission configuration indicator state associated with a communications channel between the UE and the base station;
determining to participate in a beam management procedure involving one or more beams associated with the transmission configuration indicator state, the beam management procedure associated with a beam configuration that indicates a mapping of the transmission configuration indicator state to one of a channel state information report configuration or a channel state information trigger state;
determining a set of resources for transmitting one or more reference signals based at least in part on the mapping;

transmitting a message indicating the beam configuration for receiving the one or more reference signals; and
participating in the beam management procedure through communication, with the UE, of the one or more reference signals on the one or more beams associated with the transmission configuration indicator state;
wherein participating in the beam management procedure further comprises:
transmitting the one or more reference signals associated with the transmission configuration indicator state, the one or more reference signals being channel state information reference signals.

15. The method of claim 14, wherein transmitting the one or more reference signals further comprises:
transmitting the one or more reference signals via a beam of the one or more beams associated with the transmission configuration indicator state.

16. The method of claim 14, wherein transmitting the one or more reference signals further comprises:
transmitting the one or more reference signals via a plurality of narrow beams that are each narrower than and spatially overlapping with, at least in part, a beam of the one or more beams associated with the transmission configuration indicator state.

17. The method of claim 14, wherein transmitting the one or more reference signals further comprises:
transmitting the one or more reference signals via a plurality of beams, the plurality of beams comprising a beam of the one or more beams associated with the transmission configuration indicator state and one or more beams neighboring the beam.

18. The method of claim 14, further comprising:
the message transmitted via radio resource control signaling, downlink control information signaling, or medium access control element signaling.

19. The method of claim 14, further comprising:
receiving a channel state information report on a set of resources, the channel state information report comprising a reference signal received power, a signal-to-noise-plus-interference ratio, or a combination thereof based at least in part on the one or more reference signals; and
determining whether to update the transmission configuration indicator state based at least in part on the channel state information report.

20. A method for wireless communications at a base station, comprising:
transmitting, to a user equipment (UE), in a downlink control information message, an indication to update a transmission configuration indicator state associated with a communications channel between the UE and the base station;
determining to participate in a beam management procedure involving one or more beams associated with the transmission configuration indicator state; and
participating in the beam management procedure through communication, with the UE, of one or more reference signals on the one or more beams associated with the transmission configuration indicator state;
wherein participating in the beam management procedure further comprises:
receiving the one or more reference signals associated with the transmission configuration indicator state, the one or more reference signals being sounding reference signals;
wherein receiving the one or more reference signals further comprises:
receiving the one or more reference signals via a resource associated with a beam of the one or more beams associated with the transmission configuration indicator state;
wherein the resource is based at least in part on a predefined rule associated with the transmission configuration indicator state or based on a message transmitted to the UE, the message comprising a sounding reference signal resource indicator associated with the transmission configuration indicator state.

21. A method for wireless communications at a base station, comprising:
transmitting, to a user equipment (UE), in a downlink control information message, an indication to update a transmission configuration indicator state associated with a communications channel between the UE and the base station;
determining to participate in a beam management procedure involving one or more beams associated with the transmission configuration indicator state;
participating in the beam management procedure through communication, with the UE, of one or more reference signals on the one or more beams associated with the transmission configuration indicator state;
determining to turn on a beam management mode, wherein determining that the base station is to participate in the beam management procedure is based at least in part on the beam management mode being on; and
transmitting a message indicating that the beam management mode is tuned on, wherein the message is transmitted via radio resource control signaling, downlink control information signaling, or medium access control element signaling.

22. An apparatus for wireless communications at user equipment (UE), comprising:
a processor;
memory coupled with the processor; and
instructions stored in the memory and executable by the processor to cause the apparatus to:
receive, in a downlink control information message, an indication to update a transmission configuration indicator state associated with a communications channel between the UE and a base station;
determine, based at least in part on receiving the indication to update the transmission configuration indicator state, that the UE is to participate in a beam management procedure involving one or more beams associated with the transmission configuration indicator state, the beam management procedure associated with a beam configuration that indicates a mapping of the transmission configuration indicator state to one of a channel state information report configuration or a channel state information trigger state;
determine a set of resources for receiving one or more reference signals based at least in part on the mapping;
receive a message indicating the beam configuration for receiving the one or more reference signals; and
participate in the beam management procedure through communication, with the base station, of one or more reference signals on the one or more beams associated with the transmission configuration indicator state;
wherein participating in the beam management procedure further comprises:

receiving the one or more reference signals associated with the transmission configuration indicator state, the one or more reference signals being channel state information reference signals.

23. An apparatus for wireless communications at a base station, comprising:

a processor;

memory coupled with the processor; and instructions stored in the memory and executable by the processor to cause the apparatus to:

transmit, to a user equipment (UE), in a downlink control information message, an indication to update a transmission configuration indicator state associated with a communications channel between the UE and the base station;

determine to participate in a beam management procedure involving one or more beams associated with the transmission configuration indicator state, the beam management procedure associated with a beam configuration that indicates a mapping of the transmission configuration indicator state to one of a channel state information report configuration or a channel state information trigger state;

determine a set of resources for transmitting one or more reference signals based at least in part on the mapping;

transmit a message indicating the beam configuration for receiving the one or more reference signals; and participate in the beam management procedure through communication, with the UE, of the one or more reference signals on the one or more beams associated with the transmission configuration indicator state;

wherein participating in the beam management procedure further comprises:

transmitting the one or more reference signals associated with the transmission configuration indicator state, the one or more reference signals being channel state information reference signals.

* * * * *